(12) United States Patent
Nicholson

(10) Patent No.: US 12,421,053 B2
(45) Date of Patent: Sep. 23, 2025

(54) HIGH-OUTPUT FLEXIBLE FEEDING OF DISCRETE PARTS

(71) Applicant: ATS CORPORATION, Cambridge (CA)

(72) Inventor: Kenneth Wayne Nicholson, Cambridge (CA)

(73) Assignee: ATS CORPORATION, Cambridge (CA)

( * ) Notice: Subject to any disclaimer, the term of this patent is extended or adjusted under 35 U.S.C. 154(b) by 0 days.

(21) Appl. No.: 18/403,675

(22) Filed: Jan. 3, 2024

(65) Prior Publication Data

US 2024/0140729 A1    May 2, 2024

Related U.S. Application Data

(63) Continuation of application No. 17/285,287, filed as application No. PCT/CA2019/051470 on Oct. 17, 2019, now Pat. No. 11,905,128.

(60) Provisional application No. 62/746,823, filed on Oct. 17, 2018.

(51) Int. Cl.
    *B65G 47/74*      (2006.01)
    *B65G 47/34*      (2006.01)
    *B65G 47/52*      (2006.01)

(52) U.S. Cl.
    CPC ............ *B65G 47/74* (2013.01); *B65G 47/34* (2013.01); *B65G 47/52* (2013.01)

(58) Field of Classification Search
None
See application file for complete search history.

(56) References Cited

U.S. PATENT DOCUMENTS

| | | | | |
|---|---|---|---|---|
| 5,178,225 A | * | 1/1993 | Anderson | G01G 13/003 53/236 |
| 5,649,410 A | * | 7/1997 | Martin | B65B 35/36 264/2.6 |
| 8,158,895 B2 | * | 4/2012 | Grundtvig | G01G 13/006 414/800 |
| 9,969,565 B1 | * | 5/2018 | Simm | B65B 35/38 |
| 11,001,400 B2 | * | 5/2021 | Kalany | B65B 35/58 |
| 2020/0282571 A1 | * | 9/2020 | Kiefer | B25J 15/0028 |

* cited by examiner

*Primary Examiner* — Kavel Singh

(57) ABSTRACT

There is provided a device, system, and method for flexible feeding capable of being integrated into an assembly system. The device includes a disperser, a part retainer, a vibrator, an excess part removal device, a pick-and-placer, carriers, a transporter, a carrier inspection disc, a part remover, a gate, a transfer station, and re-entry tracks. The method includes dispersing parts, agitating parts, removing excess parts, picking captured parts, placing the captured parts into carriers, inspecting the carriers, positioning the carriers at a transfer station, and transferring the parts to a downstream processor. The system includes a flexible feeding device configured to perform flexible feeding operations, a data processor, and a medium having machine-readable instructions executable by the data processor and configured to cause the data processor to generate signals useful in the synchronization of two or more flexible feeding operations.

27 Claims, 31 Drawing Sheets

HIGH-OUTPUT FLEXIBLE FEEDING OF DISCRETE PARTS

CROSS-REFERENCE TO RELATED APPLICATIONS

This application is a continuation of U.S. application Ser. No. 17/285,287, filed Sep. 10, 2021, which is a 35 USC 371 national stage entry of International Patent Application No. PCT/CA2019/051470, filed Oct. 17, 2019, which claims priority to U.S. Provisional Patent Application No. 62/746,826, filed Oct. 17, 2018. The entire contents of each of U.S. application Ser. No. 17/285,287, International Patent Application No. PCT/CA2019/051470, and U.S. Provisional Patent Application No. 62/746,826 are hereby incorporated by reference for all purposes.

TECHNICAL FIELD

The following relates generally to high-output flexible feeding of discrete parts and more specifically to devices, systems, and methods for flexible feeding capable of being integrated into an assembly system.

BACKGROUND

A common requirement of assembly machines is to incorporate means for receiving discrete parts in a disordered state in bulk packaging; converting them into a more highly ordered state compatible with the needs of a downstream manufacturing operation; and delivering them in this more highly ordered state such that they can be used in said downstream operation. This process is described variously as parts "feeding" or "distribution."

The most frequently used technique for feeding parts is to load them into "vibratory" or "centrifugal" systems that agitate them and place them in directed motion. Once in motion, the parts can be guided onto tracks or conveyors that transport them in single file to assembly machine workstations. As their names imply, vibratory feeders agitate parts with mechanical vibrations; centrifugal feeders do so by placing the parts onto a spinning disc that forces them to follow a circumferential path toward an output point. But both methods have characteristics that present technical and financial drawbacks, particularly in the face of growing demands for versatility in production assets.

One drawback is that they are highly customized, their use usually limited to one particular type of part or at best, to a small range of similar parts. Another drawback is that they rely on the finely tuned craftwork of skilled technicians. They are thus more "artisanal" than "engineered." This tends to make them expensive; problematic to maintain; highly sensitive to changes in part materials, colors, and surface characteristics; and susceptible to slowing, stalling, or jamming as a result of imperfections in the parts that arise from upstream processes (e.g., molding, stamping, etc.). A further drawback is that they tend to be large, noisy, and energy-intensive.

Furthermore, parts frequently must be oriented in a particular attitude before they can be used in an assembly process. Although in some cases conventional feeding systems can themselves place parts in the required orientation, in many cases they cannot, meaning that supplemental orientation mechanisms must be added. And even in those cases when conventional feeding systems can deliver parts in the required orientation, this often requires that the parts have suitable physical features that permit their engagement and retention by special tooling.

Some have attempted to overcome these problems and to address the limited versatility of conventional feeding systems. So-called "flexible feeding systems" have been developed and commercialized in a variety of forms. The most common employ robots guided by machine vision. To that end, a quantity of parts is dispersed into an area in which a machine vision system can determine if one or more parts is in an orientation suitable for pick-up by a robot. If so, this information is communicated to the robot such that it can move as necessary to grasp the part. If not, the parts are usually agitated in some manner in hopes that one or more end up in the attitude needed for access by the robot.

A disadvantage to these vision-guided robotic feeding systems is that their maximum output rate is limited (60 parts per minute seems to be a common ceiling). They are thus not suited for use in assembly systems that require higher output rates, such as those needed in the assembly of consumer packaged goods; disposable medical devices; and other high-volume industries.

There is a need for a device, system, or method to overcome the output limitations of conventional flexible feeding systems, and to provide a scalable means of achieving a higher output rate than those found in current methods.

SUMMARY

In a first aspect, the present disclosure provides a method of feeding parts. The method comprises: obtaining a plurality of parts on a part-retaining device. The part-retaining device defines part holders and each part holder is configured to receive and hold an individual part of the plurality of parts.

The method further comprises agitating the part-retaining device when the plurality of parts are on the part-retaining device. An agitation of the part-retaining device is such that is causes some of the part holders to receive and hold individual parts of the plurality of parts. The part holders that have received and that hold individual parts of the plurality of parts can be referred to as occupied part holders.

The method also comprises removing, from the part-retaining device, any part of the plurality of parts that has not been received by a part holder.

Additionally, the method comprises picking individual parts from the occupied part holders to obtain picked parts.

Further yet, the method comprises providing the picked parts to a downstream process.

Further, the present disclosure provides a tangible, non-transitory computer-readable medium having recorded thereon instructions to be carried out by a processor to control a system for feeding parts to carry out the method of feeding parts as described above.

These and other embodiments are contemplated and described herein. It will be appreciated that the foregoing summary sets out representative aspects of devices, systems, and methods for flexible feeding to assist skilled readers in understanding the following detailed description.

In another aspect, the present disclosure provides a system for feeding parts to an assembly mechanism. The system comprises a part-retaining device defining part holders. Each part holder is configured to receive and hold an individual part.

The system further comprises a series of part carriers configured for coupling to a transporter. Each part carrier of the series of part carriers has a portion configured to receive and hold an individual part.

Additionally, the system comprises a pick-and-placer device that has grippers. The pick-and-placer device is configured to simultaneously grip, with the grippers, a plurality of individual parts held by the part holders and to transfer, to a corresponding plurality of part carriers of the series of carriers, the individual parts gripped by the grippers.

In another aspect, the present disclosure provides a method of configuring a system for feeding parts to an assembly mechanism. The system that is being configured by the method comprises a first part-retaining device defining first part holders, the first part holders being spaced apart by a first pitch, each part holder of the first part holders configured to receive and hold a respective first individual part having a first shape and first dimensions.

The system also comprises an agitator device coupled to the first part-retaining device and configured to agitate the first part-retaining device, an agitation of the first part-retaining device to move a plurality of the first individual parts placed on the first part-retaining device to align some of the plurality of first individual parts with respective first part holders during the agitation, the first part holders to receive and hold the first individual parts aligned therewith.

The system further comprises a transporter.

Additionally, the system comprises a series of first part carriers coupled to the transporter, the first part carriers of the series of first part carriers each having a respective first portion configured to receive and hold one of the first individual parts, the first portions, when the series of first part carriers are coupled to the transporter, being spaced apart by a gap equal to the first pitch.

Further, the system comprises a pick-and-placer device having grippers, the grippers being spaced apart by a distance equal to the pitch, the pick-and-placer device configured to simultaneously grip, with the grippers, a plurality of first individual parts held by the first part holders and to transfer, to a corresponding plurality of part carriers of the first series of carriers, the first individual parts gripped by the grippers.

The method that configures the system comprises uncoupling the first part-retaining device from the agitator device.

The method further comprises coupling to the agitator device a second part retaining device defining second part holders, the second part holders being spaced apart by a second pitch, each part holder of the second part holders configured to receive and hold a respective second individual part having a second shape and second dimensions.

The method also comprises uncoupling the series of first carriers from the transporter.

Further, the method comprises coupling to the transporter a series of second part carriers, the second part carriers of the series of second part carriers each having a respective second portion configured to receive and hold one of the second individual parts, the second portions, when the series of second part carriers are coupled to the transporter, being spaced apart by a gap equal to the second pitch.

Furthermore, the method comprises reconfiguring the pick-and-placer device to simultaneously grip, with the grippers, a plurality of second individual parts held by the second part holders and to transfer, to a corresponding plurality of part carriers of the series of second carriers, the second individual parts gripped by the grippers, wherein at least one of the following (a) through (c) is true: (a) the second pitch is different from the first pitch, (b) the second shape is different from the first shape, and (c) the first dimensions are different from the second dimensions.

In another aspect, the present disclosure provides a flexible feeding device is provided, the device comprising: a disperser; a part retainer comprising one or more pockets arranged to retain at least one of a plurality of discrete parts in a particular attitude, the part retainer located below the disperser; a vibrator coupled to the part retainer; an excess part removal device operably connected to the part retainer; a pick-and-placer programmed to pick at least one of the plurality of discrete parts from the part retainer; a plurality of carriers designed to receive the at least one of the plurality of discrete parts from the pick-and-placer and hold the at least one of the plurality of discrete parts during transportation; a transporter comprising a track on which the plurality of carriers moves in a closed loop; a carrier inspection disc comprising a carrier inspector programmed to identify which of the plurality of carriers are empty, which of the plurality of carriers are full, and which one or more of the plurality of discrete parts are not passable; a part remover programmed to remove the one or more of the plurality of discrete parts that are not passable; a gate programmed to allow the plurality of carriers that are full to continue for further processing and the plurality of carriers that are empty to be recirculated within range of the pick-and-placer; a transfer station oriented to obtain the plurality of discrete parts from the plurality of carriers for processing; a first re-entry track positioned next to the carrier inspection disc directing the plurality of carriers that are empty originating from the carrier inspection disc towards the transporter; and a second re-entry track positioned next to the transfer station directing the plurality of carriers that are empty originating from the transfer station towards the transporter.

In another aspect, the present disclosure provides a method of flexible feeding is provided, the method comprising: positioning carriers that are initially empty at a loading station; placing bulk parts in a metering device; dispensing a metered amount of the bulk parts into an agitating system; agitating the metered amount of the bulk parts; removing parts that did not get captured in holders; picking parts that got captured in the holders with a pick-and-placer; placing parts that got picked by the pick-and-placer into the carriers; inspecting the carriers to determine if the carriers are empty; if an inspected carrier is not empty: positioning the inspected carrier at a transfer station, obtaining parts from the inspected carrier with a transfer device, transferring obtained parts to a downstream processor; and if the inspected carrier is empty, positioning the inspected carrier at the loading station.

In another aspect, the present disclosure provides a system of flexible feeding is provided, the system comprising: a flexible feeding device configured to perform a plurality of flexible feeding operations comprising: positioning carriers that are initially empty at a loading station, placing bulk parts in a metering device, dispensing a metered amount of the bulk parts into an agitating system, agitating the metered amount of the bulk parts, removing parts that did not get captured in holders, picking parts that got captured in the holders with a pick-and-placer, placing parts that got picked by the pick-and-placer into the carriers, inspecting the carriers to determine if the carriers are empty, positioning the inspected carriers at a transfer station, obtaining parts from the inspected carriers with a transfer device, and transferring obtained parts to a downstream processor; a data processor; and a medium comprising machine-readable instructions executable by the data processor and configured to cause the data processor to generate signals useful in synchronization of at least two of the plurality of flexible feeding operations.

In another aspect, the present disclosure provides a system of flexible feeding is provided, the system comprising: a flexible feeding device: a data processor; and a medium comprising machine-readable instructions executable by the data processor and configured to cause the data processor to generate signals that instruct the flexible feeding device to execute a plurality of flexible feeding operations, the plurality of flexible feeding operations comprising: positioning carriers that are initially empty at a loading station, placing bulk parts in a metering device, dispensing a metered amount of the bulk parts into an agitating system, agitating the metered amount of the bulk parts, removing parts that did not get captured in holders, picking parts that got captured in the holders with a pick-and-placer, placing parts that got picked by the pick-and-placer into the carriers, inspecting the carriers to determine if the carriers are empty, positioning the inspected carriers at a transfer station, obtaining parts from the inspected carriers with a transfer device, and transferring obtained parts to a downstream processor.

These and other embodiments are contemplated and described herein. It will be appreciated that the foregoing summary sets out representative aspects of devices, systems, and methods for flexible feeding to assist skilled readers in understanding the following detailed description.

BRIEF DESCRIPTION OF THE DRAWINGS

The following will be described with reference to the drawings, wherein.

DETAILED DESCRIPTION

Figure 1:
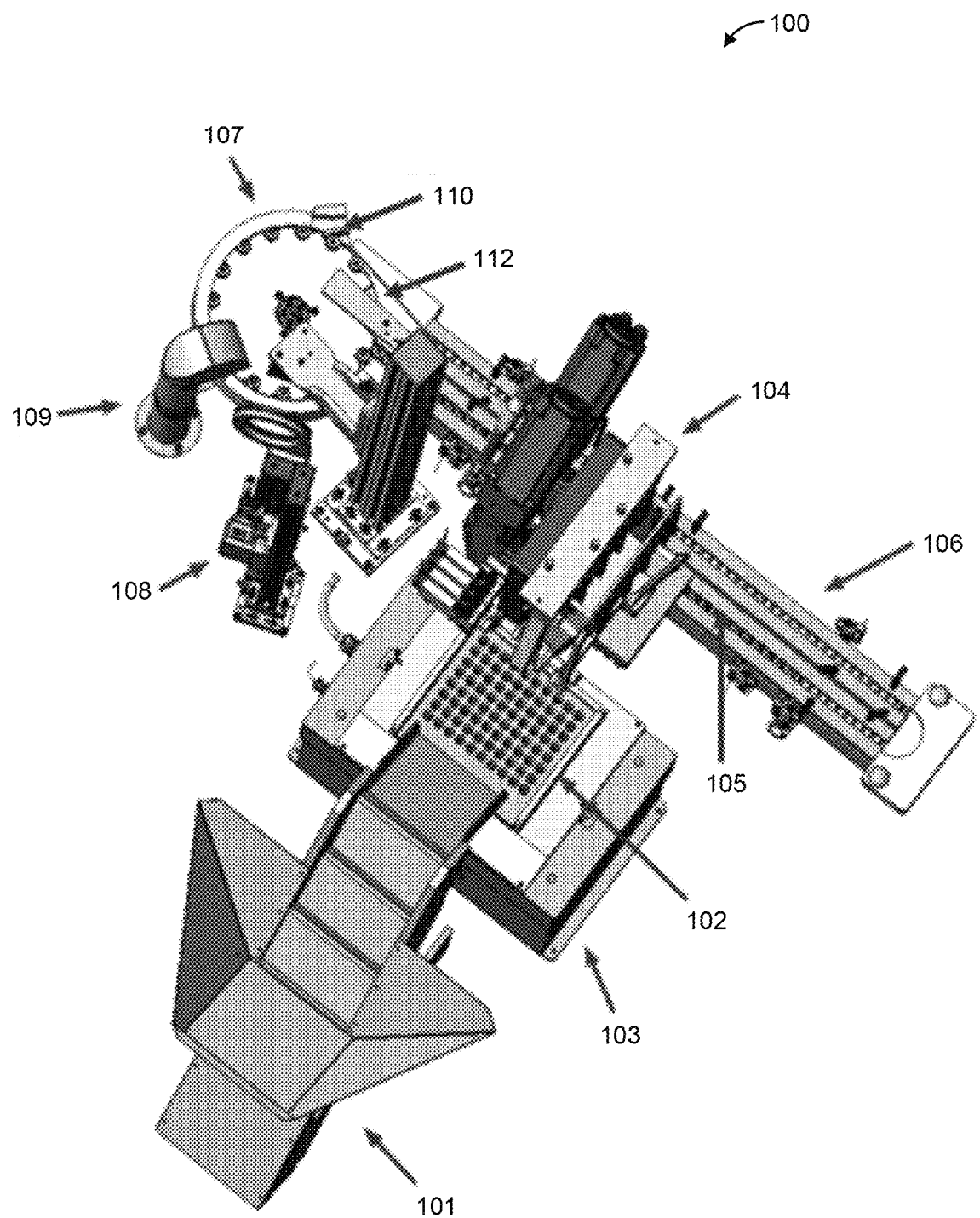
FIG. 1 illustrates, in accordance with the present disclosure, an embodiment of a flexible feeding device.

For simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures, and components have not been described in detail so as not to obscure the embodiments herein. Also, the description is not to be considered as limiting the scope of the embodiments described herein.

The following describes devices, systems, and methods for flexible feeding capable of being integrated into an assembly system.

In an aspect, a flexible feed system takes parts from bulk, randomly disperses the parts in a defined area on a part-retaining device, agitates the parts using vibrations to arrange a stochastically determined number of parts in an ordered manner (i.e., the "oriented" parts), and removes the remaining excess parts. A robotic device can obtain the oriented parts and place them into waiting carriers. An assembly system can process the carriers such that the parts held in waiting carriers can be delivered downstream to other processes that operate continuously and deterministically.

Referring first to FIG. 1, an exemplary flexible feeding device 100 is shown. Disperser 101 is a mechanism for receiving and dispersing a quantity of disordered, discrete parts. Disperser 101 may comprise a receptacle to receive the discrete parts (or "bulk parts" when referring to two or more discrete parts; discrete parts can be referred to as individual parts) and a chute to allow the discrete parts to be dispersed on a part retainer (part-retaining device) 102. Alternatively, or in addition, disperser 101 may comprise a flat belt conveyor to disperse the discrete parts. Disperser 101 may comprise a metering device that causes a controlled number (or range) of bulk parts (e.g., a "metered amount") to be dispensed. In some embodiments, the metering device may be a tray (not shown), or a portion of a tray, that funnels bulk parts into a lidless box with a raiseable bottom. The raiseable bottom can then eject a metered quantity of the bulk parts.

Part retainer 102 is a part-retaining device that has of one or more part holders (e.g., pockets, cavities, nests, holders, protrusions, or other similarly functioning physical features). The part holders of the part retainer 102 may be designed and/or arranged such that a single part holder can receive and hold (retain) a single discrete part (e.g., product) in a particular attitude. Part retainer 102 may have the part holders all in one row, in multiple rows, or in some other configuration. If the disperser 101 comprises a chute, then part retainer 102 may be located under the chute of the disperser 101, such that discrete parts that go through the chute of the disperser 101 arrive on the part retainer 102. If the disperser 101 comprises a flat belt conveyor, then the flat belt conveyor may be positioned over the part retainer 102, and the flat belt conveyor can be activated (e.g., turned on) to drop the discrete parts onto the part retainer 102. If the disperser 101 comprises a metering device, then part retainer 102 may be located such that a metered amount of bulk parts is ejected onto the part retainer 102. Part retainer 102 may sit atop, be operably connected to, be integrated with, be interconnected with, be in electromagnetic communication with, or otherwise be in communication with an excess part removal device 150 (e.g., a tilting device) (shown in FIG. 2).

Vibrator 103 is a mechanism for applying vibrational energy to (or "agitating") parts placed in part retainer 102 by disperser 101 such that a stochastically determined percentage can be captured by holders. The combination of the part retainer 102 and vibrator 103 may together form an "agitating system." The vibrator 103 may be coupled with the part retainer 102 in such a manner that the vibrational energy created by vibrator 103 causes the part retainer 102 to vibrate in substantially the same manner and/or substantially the same amplitude as the vibrator 103. It will be appreciated that other parts may be combined so that one part has the functionality of any two (or more) labelled parts.

Pick-and-placer 104 is a programmable pick-and-place mechanism equipped with grippers that can obtain a set of parts from the part holders and place them into waiting carriers (part carriers) 105. Pick-and-placer 104 can have any number of grippers, such as one, five, the number of discrete parts that a carrier 105 is capable of carrying, the number of holders in a row of holders in part retainer 102, the total number of holders in part retainer 102, etc. The grippers of pick-and-placer 104 may be all in one row, in multiple rows, or in some other configuration (e.g., curvilinear). Pick-and-placer 104 may also be equipped with a mechanism for applying vibrational energy. Alternatively, pick-and-placer 104 may shake or otherwise apply vibrational energy by virtue of its own inherent servo-axes. The combination of the pick-and-placer 104 and vibrator 103 may together form a "vibrating pick-and-placer."

Carriers 105 are waiting carriers (e.g., pucks), each of which is designed or shaped to hold one or more of the discrete parts (i.e., cargo). That is, the carriers 105 have a portion that is configured to receive and hold an individual (discrete) part. Transporter 106 is a closed-loop transport system for moving carriers 105. The transporter 106 may comprise one or more tracks, a conveyor belt, a tower, a cart, or other suitable device or system for moving cargo. For convenience, the part of the transporter 106 within range of the grippers of the pick-and-placer 104 may be referred to as a "loading station" or as a "loading location". Carrier inspection disc 107 receives carriers from the transporter 106 and moves the carriers to a carrier inspector (inspection device) 108, which determines if a given carrier contains a cargo (a part) permissible for delivery to a transfer station 111 (shown in FIG. 4) for subsequent transfer to a downstream processor (not shown). The carrier inspector 108 can be based on any suitable type of technology such as optical scanning, magnetic sensing, etc. The carrier inspector 108, or any other suitable inspection device, is configured to determine a state of the carriers being inspected. In some embodiments, the state can be an empty state, defined by the absence of a part in the inspected part carrier; a pass state, defined by presence of a part in the part carrier and a determination that the part meets a pass criteria; and a fail state, defined by a carrier carrying a part that does not meet the pass criteria. In other embodiments, the state of carrier can be determined by first determining if the carrier is in the empty state or not, and then, for the carriers that are not in the empty state, determining if the carrier is in the pass state or not. Embodiments where the determination of a state of a carrier is carried in out in multiple steps, starting with determining if the carrier is in one particular state of three aforementioned states and, if the carrier is not in the one particular state, determining if the carrier is one of the other states, are to be considered within the scope of the present disclosure. Carrier inspection disc 107 may be a filter disc, such as an RSM TECHNOLOGY® filter disc available from ATS Automation Tooling System Inc. Carrier inspector 108 is a device that identifies empty carriers and bad parts. Carrier inspector 108 may be programmed to identify which carriers 105 are empty, which carriers 105 are full, and which discrete parts are not passable (e.g., not suitable for downstream processing). Part remover 109 is a mechanism for removing parts from carriers 105 that do not pass the inspection. Part remover 109 may be programmed to remove the discrete parts that have been identified by carrier inspector 108 as not passable. The part remover 109 can be based on any suitable type of technology such as, for example, vacuum technology, electro-mechanical technology, magnetism, etc.

Gate 110 is a gating mechanism that allows full carriers 105 to continue downstream for further processing and empty carriers 105 to be recirculated within range of pick-and-placer 104. The gate 110 may be programmed to direct carriers 105, controlled by carrier inspector 108, or operably linked to any device that identifies which carriers 105 are full or empty, for example. Transfer station 111 (shown in FIG. 4) is a device that obtains parts from the carriers 105 for transfer to a downstream processor (not shown); the downstream processor may be an assembly machine, for example. Transfer station 111 may be oriented to receive the carriers 105 from the transporter 106. A first re-entry track 112 serves as a re-entry point for empty carriers 105 from carrier inspection disc 107 to be recirculated so as eventually to return within range of pick-and-placer 104. This recirculation can be accomplished by directing the empty carriers 105 back onto the transporter 106. The first re-entry track 112 may be positioned on or next to the carrier inspection disc 107. A second re-entry track 113 (shown in FIG. 4) serves as a re-entry point for empty carriers 105 returning from transfer station 111 to be recirculated so as eventually to return within range of pick-and-placer 104. This recirculation can be accomplished by directing the empty carriers 105 back onto the transporter 106. The second re-entry track 113 may be positioned on or next to the transfer station 111.

In some embodiments, the part holders in the part retaining device 102 can be spaced apart by a same pitch. The grippers of the pick-and-placer 104 can be adjustable such that, at the moment the grippers grip the parts held by the holders, the grippers are spaced apart by a gap equal to the pitch separating the holders. Further, when the carriers are positioned on the transporter and are disposed to receive parts from the grippers, the interspacing between the portions of the carriers that are configured to hold individuals parts are spaced apart by a distance that is equal to the pitch.

Figure 2:
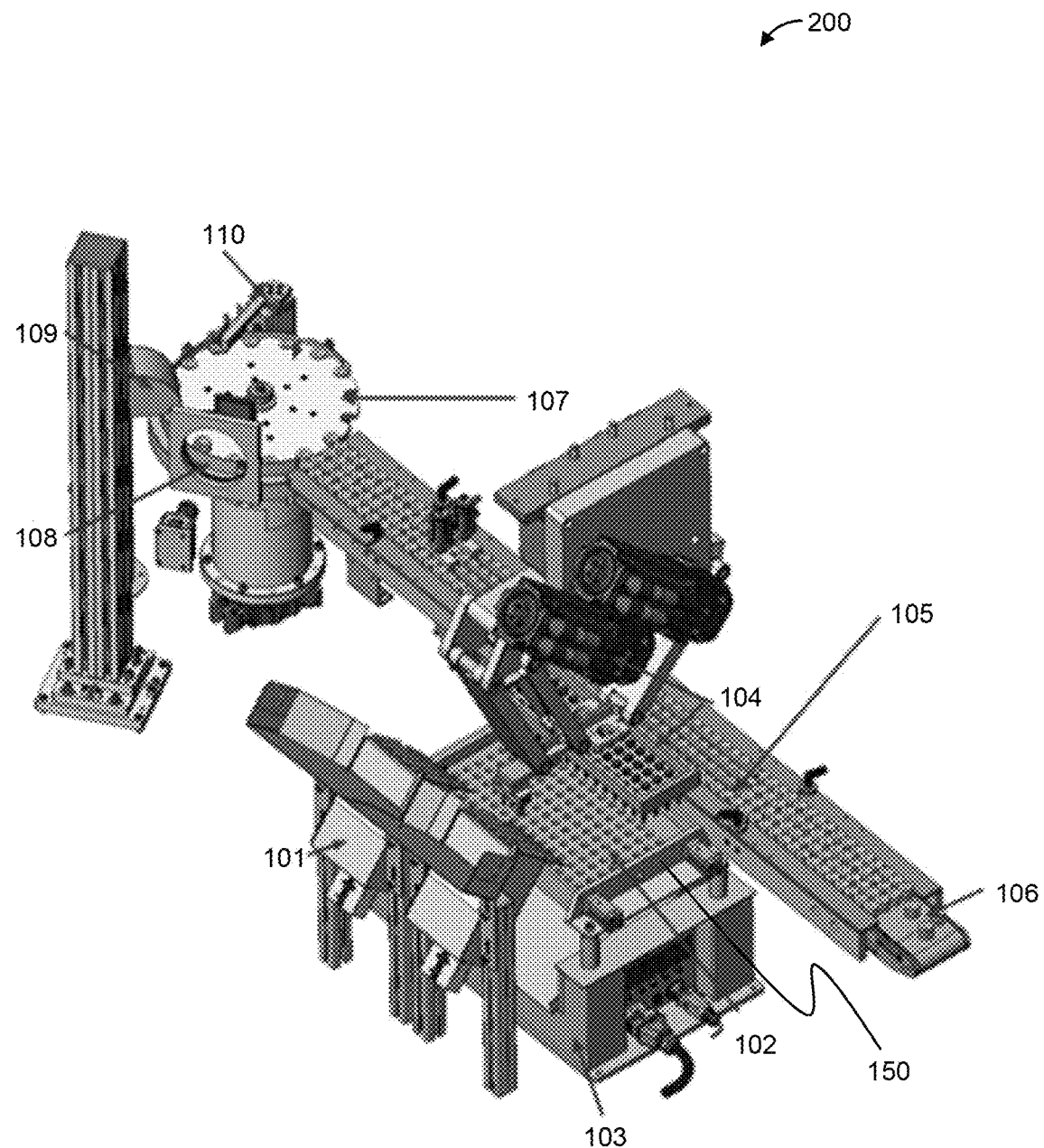
FIG. 2 illustrates, in accordance with the present disclosure, another embodiment of a flexible feeding device, which has a transporter designed to deliver more than one row of carriers to the carrier inspection disc.

Referring now to FIG. 2, an embodiment of an exemplary flexible feeding device 200, with a transporter designed to deliver more than one row of carriers to a carrier inspection device, is shown. Flexible feeding device 200 has several rows of carriers 105 being delivered by transporter 106 to carrier inspection disc 107. Not shown is the recirculation path from carrier inspection disc 107 to pick-and-placer 104, but it is understood that such a path exists. This embodiment permits, for example, multiple rows of parts to be obtained at once from part retainer 102 by pick-and-placer 104 and transferred to carriers 105.

Figure 3:
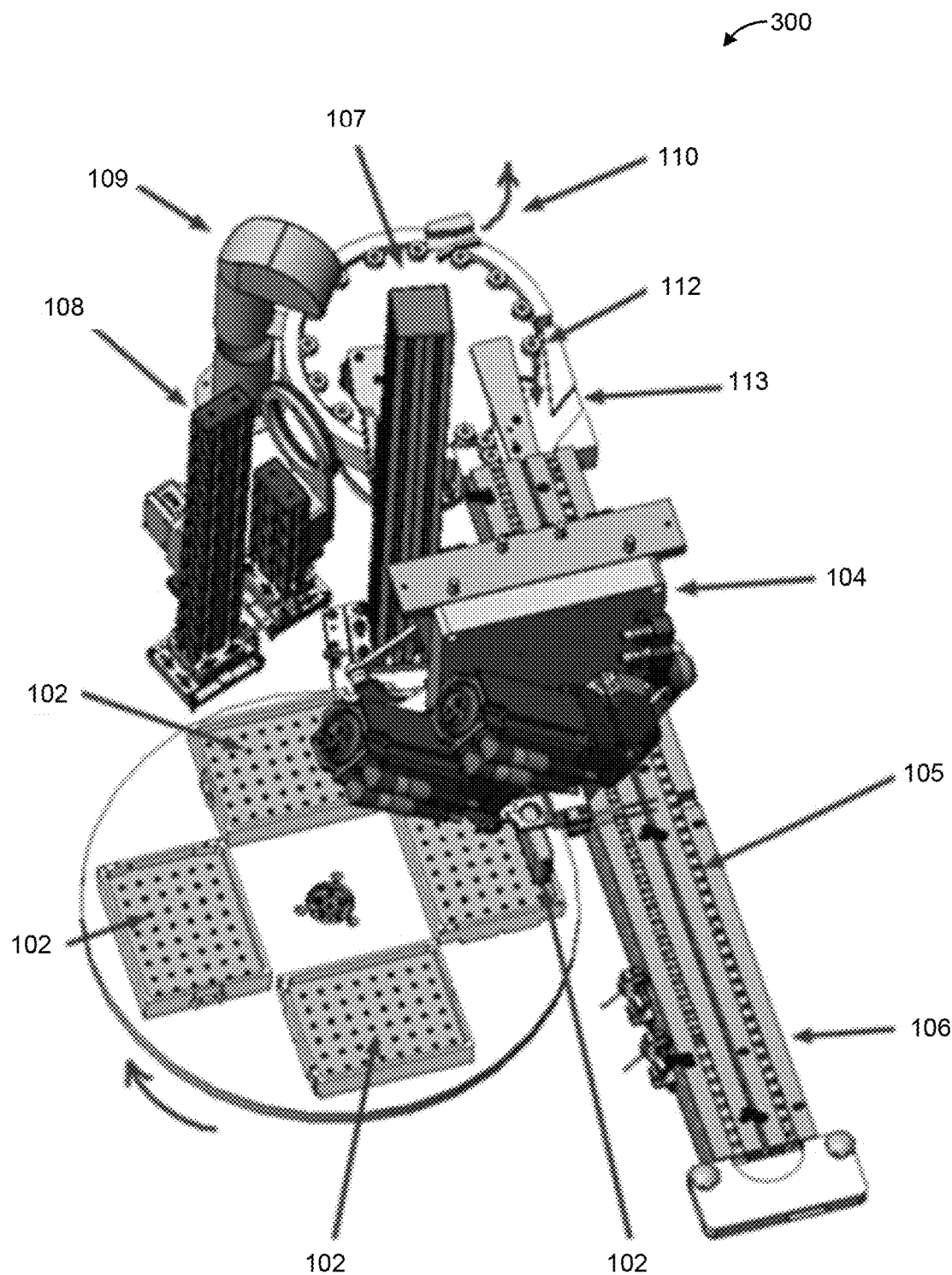
FIG. 3 illustrates, in accordance with the present disclosure, another embodiment of a flexible feeding device, which has multiple part retainers.

Referring now to FIG. 3, an embodiment of an exemplary flexible feeding device 300, with multiple part retainers, is shown. Multiple part retainers 102 are arranged on a rotating table such that vibrational energy can be applied in successive stations, thus increasing the overall agitation time and thereby increasing the probability that a higher number of discrete parts will be captured by the holders of part retainers 102.

Figure 4:
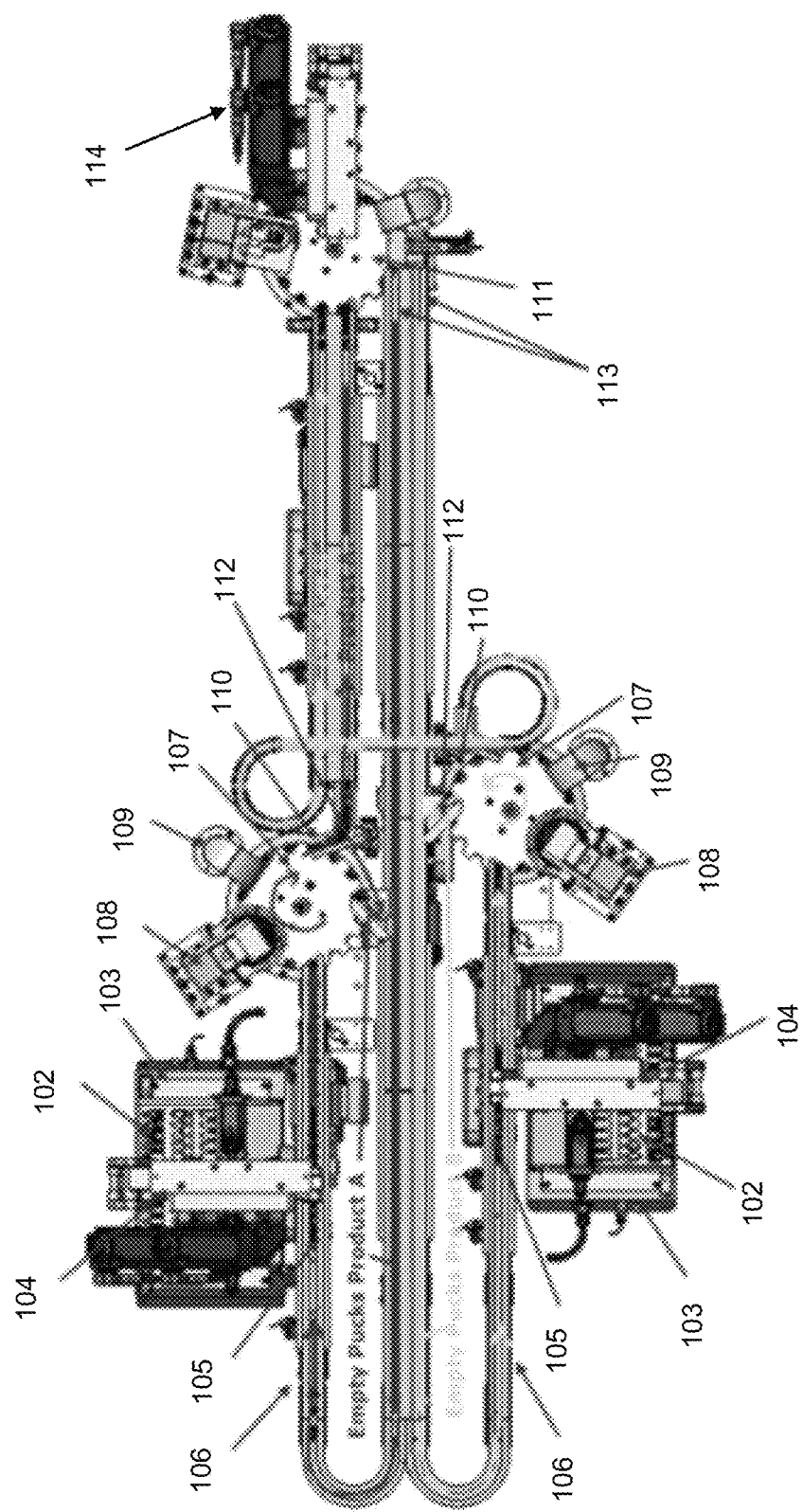
FIG. 4 illustrates, in accordance with the present disclosure, an embodiment of a flexible feeding device, having two independent flexible feeding subdevices.

Referring now to FIG. 4, an embodiment of an exemplary flexible feeding device 400, with two independent flexible feeding subdevices, is shown. Elements 101 to 110, 112, and 113 are replicated, resulting in two independent flexible feeding subdevices, which are integrated with transfer station 111. Transfer station 111 is a subsystem that receives carriers containing discrete parts from both flexible feeding subdevices for subsequent transfer to a downstream processor. Transfer station 111 may be a filter disc that forms part of a computer numerical control (CNC) assembly pick-and-place engine. Transfer device 114 is a device that obtains the discrete parts from the carriers received in the transfer station 111 and transfers the discrete parts to the downstream processor (not shown), which may be an assembly machine. Transfer device 114 may be, for example: a component of transfer station 111; part of the downstream processor; a pick-and-place mechanism on an assembly machine; etc.

Flexible feeding device 100 (or any of the other embodiments 200, 300, or 400) may operate cyclically as described hereunder. Discrete parts are delivered to a receiving area of disperser 101, wherein they are made available for dispersal onto part retainer 102. Disperser 101 intermittently disperses a disordered quantity of these discrete parts into a confined volume defined by the boundaries of part retainer 102. Following dispersal of the parts, vibrational energy is applied for some duration to part retainer 102 by vibrator 103, agitating the parts and causing them to move randomly within the boundaries of part retainer 102. The holders (e.g., pockets) of part retainer 102 have a physical form or features such that each can capture and retain a single discrete part, provided that (a) the amplitude and frequency of the vibrational energy applied to part retainer 102 by vibrator 103 are sufficient to cause a part to move randomly within the boundaries of part retainer 102 and to achieve proximity to the holder, notwithstanding the part's subjection to random collisions with other parts, with said boundaries, and with elements of part retainer 102, including the holder itself; (b) the amplitude and frequency of the vibrational energy applied to part retainer 102 by vibrator 103 are not such that they prevent a part from being retained by the holder once therein captured; and (c) a part attaining a position proximate to the holder is also in an orientation suitable for capture by the holder.

The capture and/or retention of a part by a holder can occur by some combination of gravity, friction, magnetism, vacuum, or similar means. Its retention can also be maintained by the use of one or more supplemental retaining elements that can be external to the holder or that can be part of the holder itself.

Figure 5A:
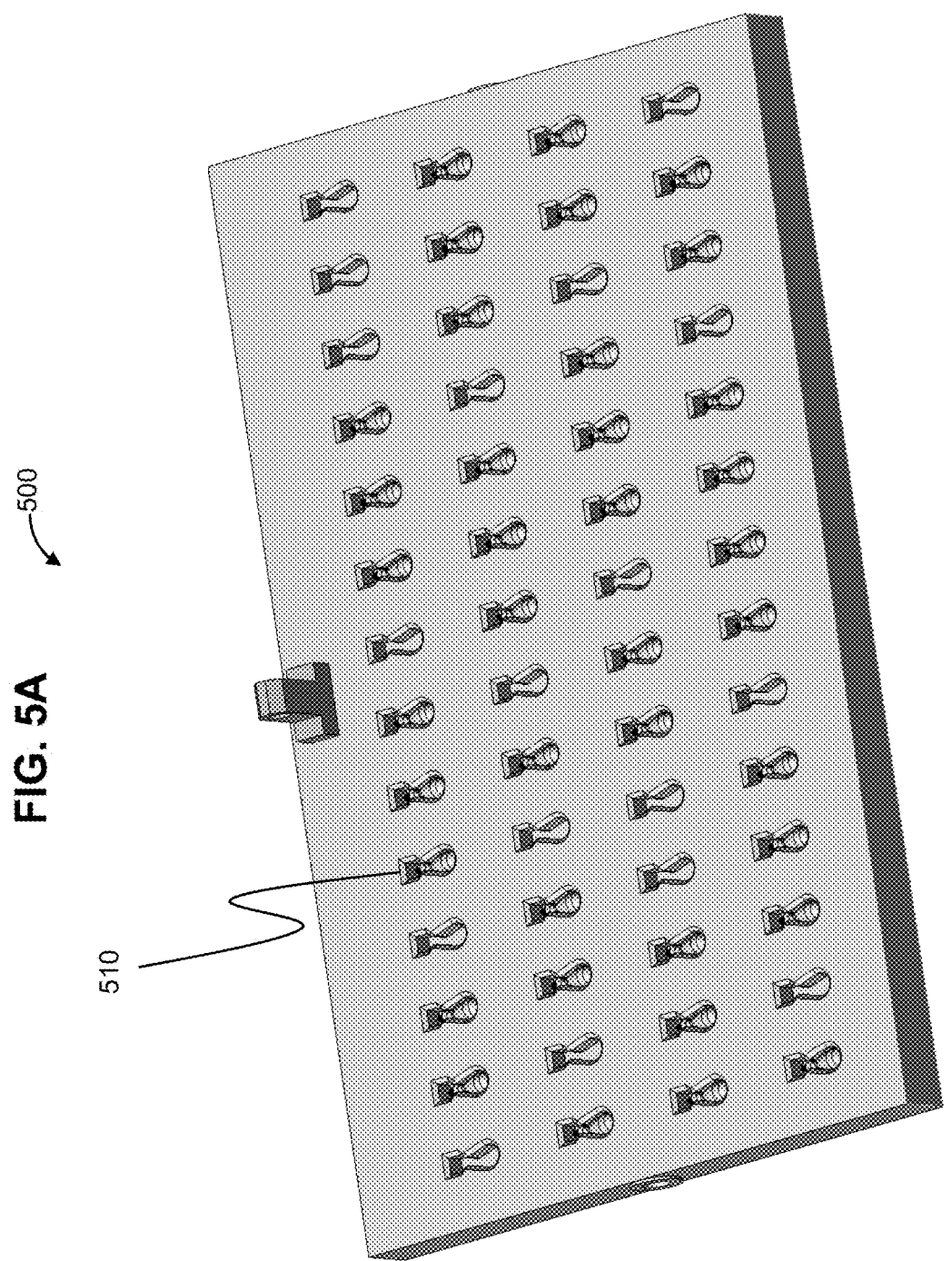
FIG. 5A illustrates, in accordance with the present disclosure, an embodiment of a part retainer for complex geometry in accordance with the present disclosure.
Figure 5B:
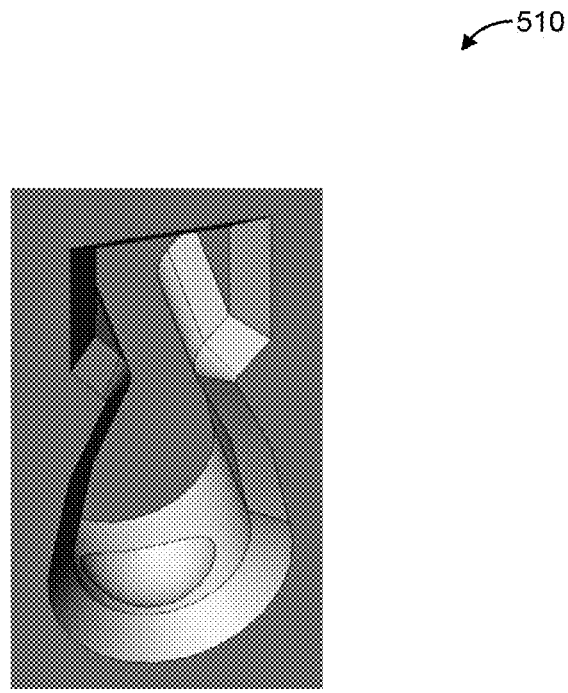
FIG. 5B illustrates, in accordance with the present disclosure, an embodiment of a pocket with complex geometry.
Figure 5C:
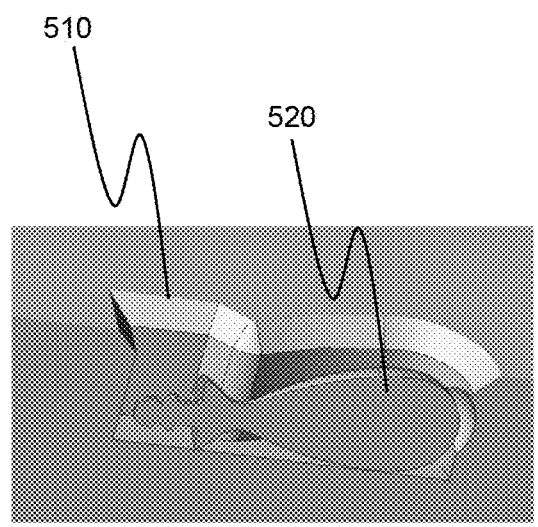
FIG. 5C illustrates, in accordance with the present disclosure, an exemplary part with complex geometry in the pocket.

Referring now to FIGS. 5A to 5C, an exemplary part retainer 500, for complex geometry, is shown. FIG. 5A illustrates the part retainer 500 with four rows of pockets 510 with complex geometry. FIG. 5B illustrates a close-up view of a single pocket 510 with complex geometry. FIG. 5C illustrates a cross-sectional view of an exemplary part 520 with complex geometry in the pocket 510.

In part retainer 500, the pockets 510 have the shape of a discrete part 520 so that, for example, the pockets 510 hold the parts 520 in a particular orientation. In some embodiments, parts 520 which are positioned within the pockets 510 arrived there as a result of random motion caused by vibrational energy, with gravity supplying the force to put the parts 520 in place. Gravity and the frictional force between a part 520 and a pocket 510 can combine to retain each part 520 in a particular pocket 510.

Figure 6A:
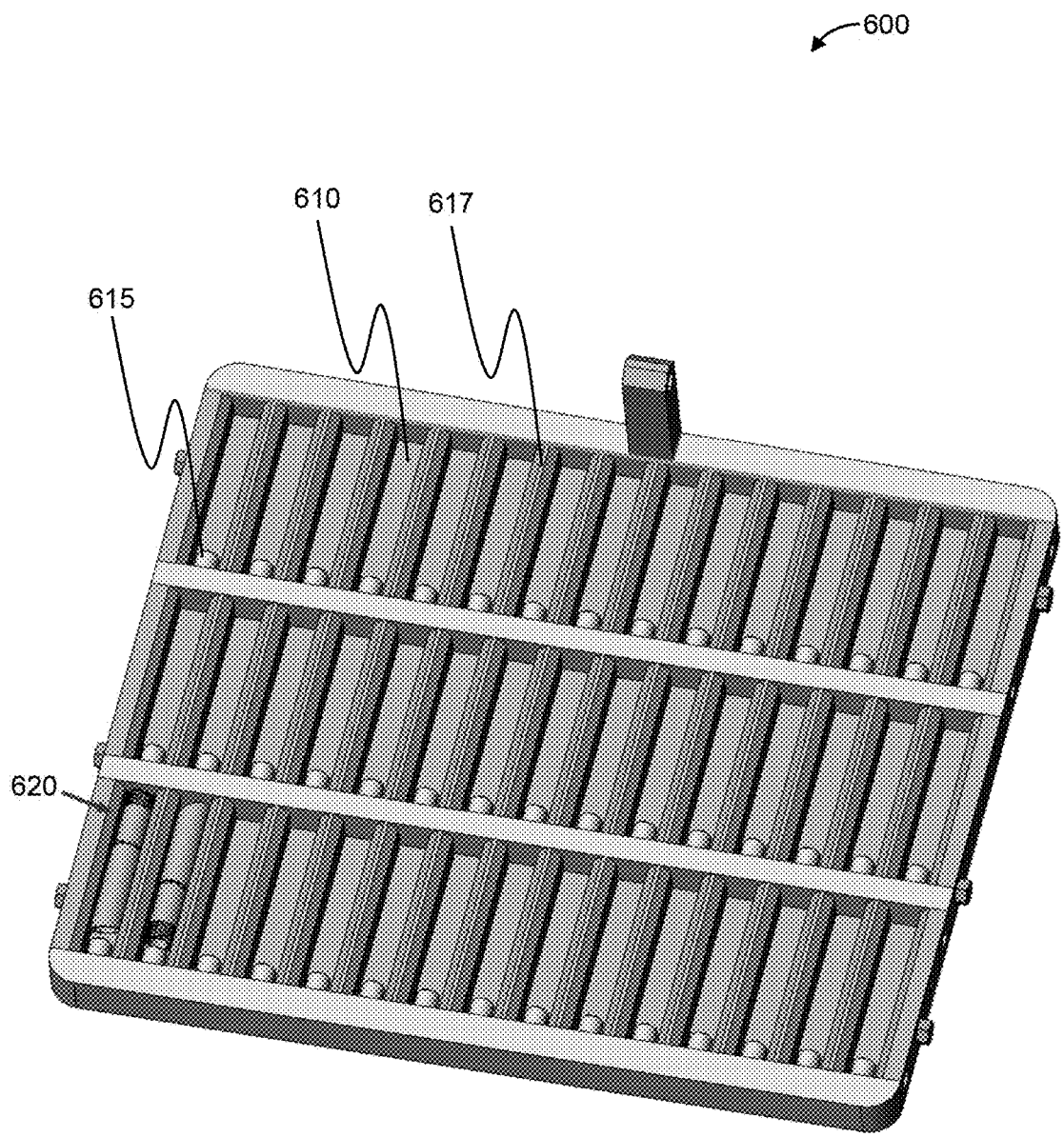
FIG. 6A illustrates, in accordance with the present disclosure, an embodiment of a part retainer with parts in pockets.
Figure 6B:
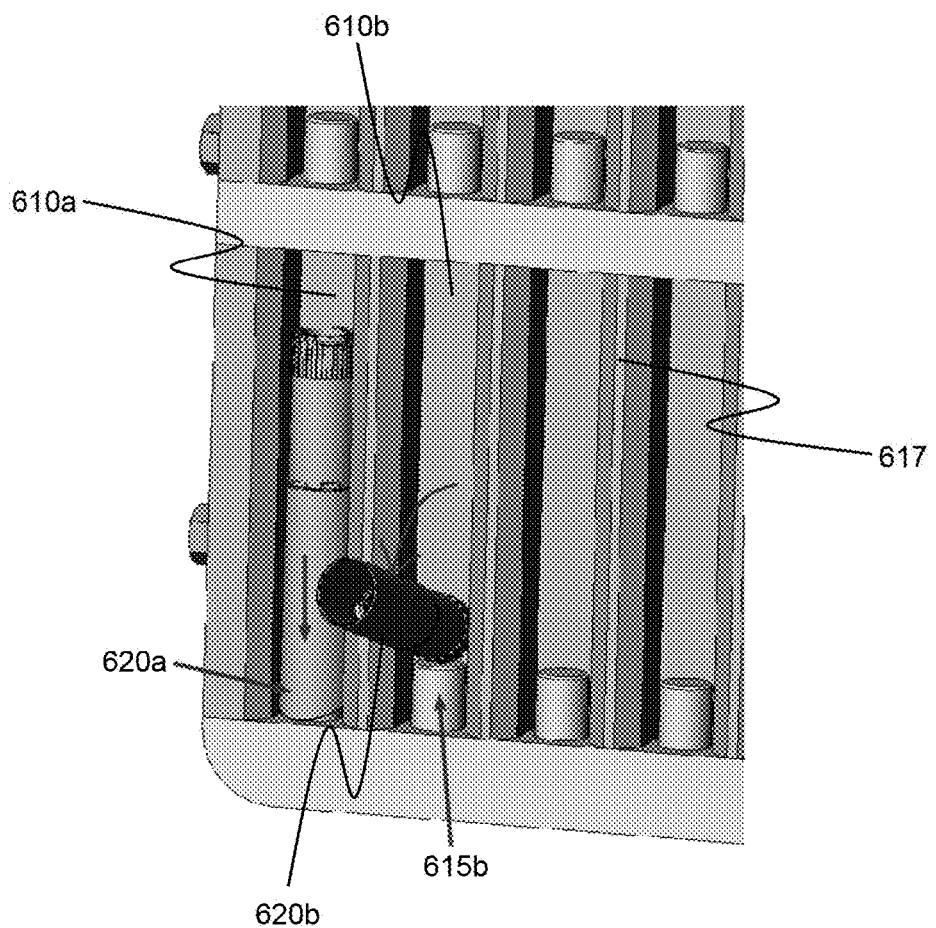
FIG. 6B illustrates, in accordance with the present disclosure, a close-up view of a portion of an embodiment of a part retainer with a non-oriented part falling away.

Referring now to FIG. 6A, an exemplary part retainer 600, with parts in one type of rectangular pocket, is shown. Part retainer 600 has three rows of pockets 610 with rectangular geometry, each pocket 610 having a protrusion 615 that parts can fall onto during agitation. Part 620 is shown at rest in a pocket 610, but not on a protrusion 615. FIG. 6B illustrates a close-up view of a portion of the part retainer 600 with a non-oriented part falling away. A first part 620a is shown after it has fallen onto a first protrusion 615a (not visible) in a first pocket 610a. A second part 620b is shown falling away, out of a second pocket 610b, as it did not fall onto a second protrusion 615b.

In part retainer 600, the shape of the pockets 610 can hold, for example, cylindrical parts 620 that have an opening on one end. Each pocket 610 can have a protrusion 615 whose outer diameter is smaller than the diameter of the opening of a part 620. Sidewalls 617 can have contoured lead-ins to help cylindrical parts fall into the pockets. Back walls of the pockets 610 can be horizontal cylindrical segments to match the form of the cylindrical parts 620. It will be appreciated that in other embodiments with differently shaped parts, the sidewalls and/or backwalls of the pockets may have different shapes. When the part retainer 600 is positioned horizontally and vibrational energy is applied, parts 620 can fall by force of gravity into the pockets 610 in one of two orientations. One orientation is one in which the open end of the part 620 is adjacent to the protrusion 615. The other orientation is one in which the closed end of the part 620 is adjacent to the protrusion 615. It is understood that by subsequently tilting the part retainer 600, those parts 620 whose open ends are adjacent to the protrusion 615 will drop onto the protrusion 615, thereby becoming securely retained. Conversely, those parts 620 whose closed ends are adjacent to the protrusion 615 will fall away by gravity once the part retainer 600 is tilted at an angle sufficiently far away from horizontal.

Figure 7A:
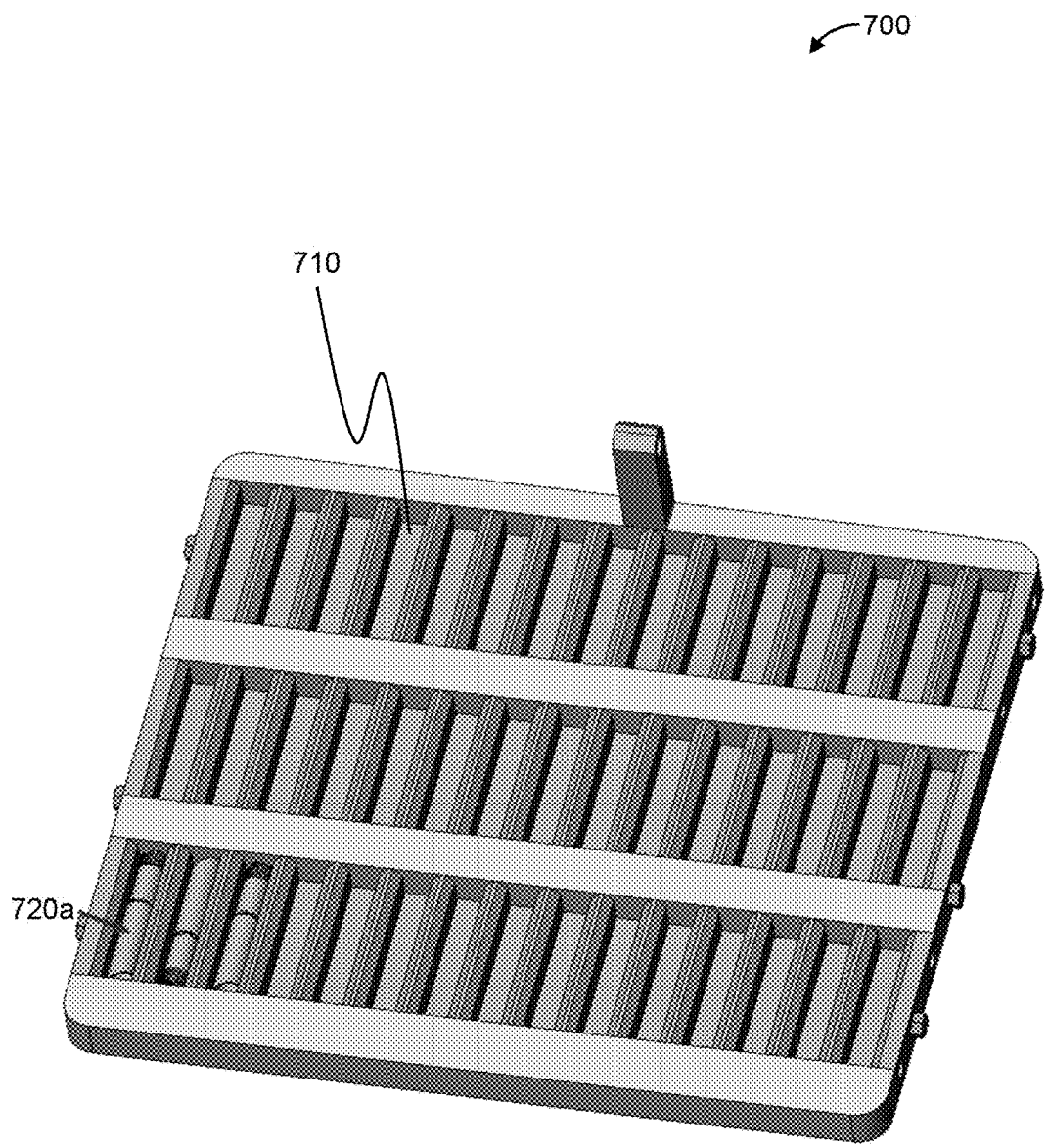
FIG. 7A illustrates, in accordance with the present disclosure, an embodiment of a part retainer with parts in pockets with different spacing.
Figure 7B:
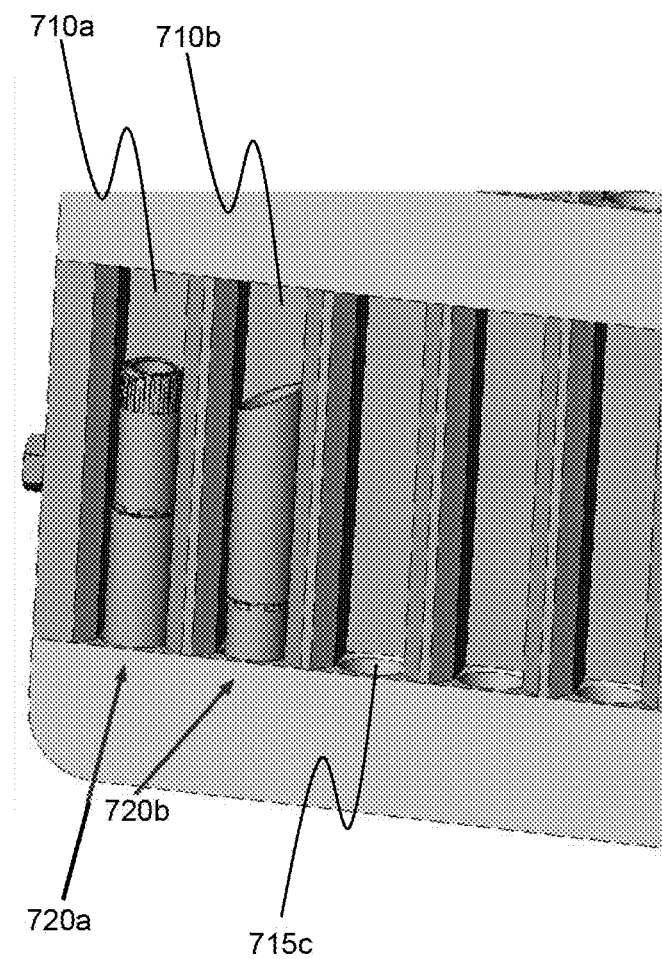
FIG. 7B illustrates, in accordance with the present disclosure, a close-up view of a portion of an exemplary part retainer with a part sliding into a recess.

Referring now to FIG. 7A, an exemplary part retainer 700, with parts in another type of rectangular pocket, is shown. Part retainer 700 has three rows of pockets 710 with rectangular geometry, each pocket 710 having a recess 715 (visible in FIG. 7B) that parts 720 can fall into during agitation. Part 720a is shown at rest in a pocket 710, but not in a recess 715. FIG. 7B illustrates a close-up view of a portion of the part retainer 700 with a part sliding into a recess. A first part 720a is shown after it has fallen into a first recess 715a (not visible) in a first pocket 710a. A second part 720b is shown after it has fallen into a second recess 715b (not visible) in a second pocket 710b. A third recess 715c may be seen with no part in it.

Figure 8:
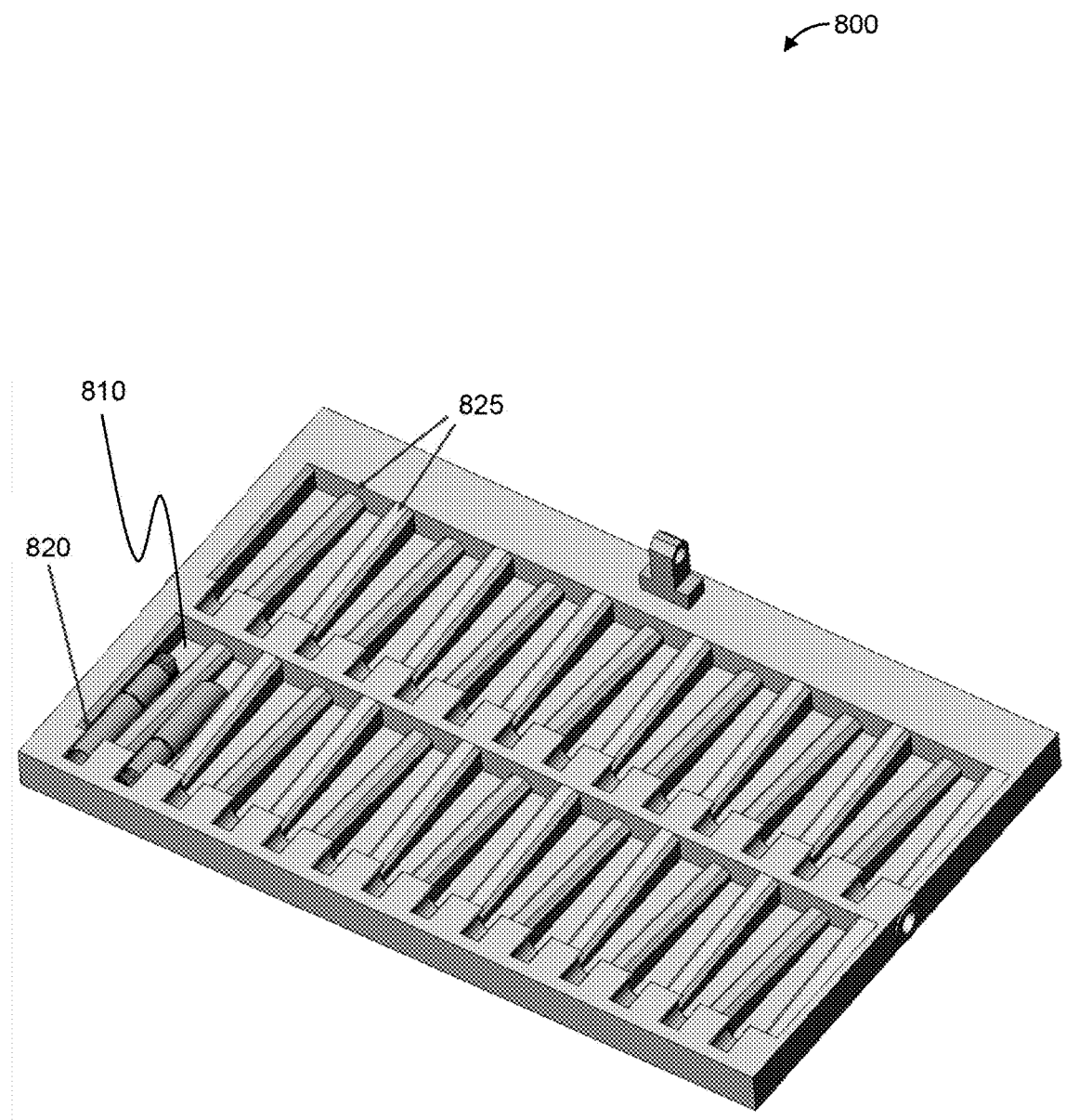
FIG. 8 illustrates, in accordance with the present disclosure, an exemplary part retainer showing tapered side walls.
Figure 9:
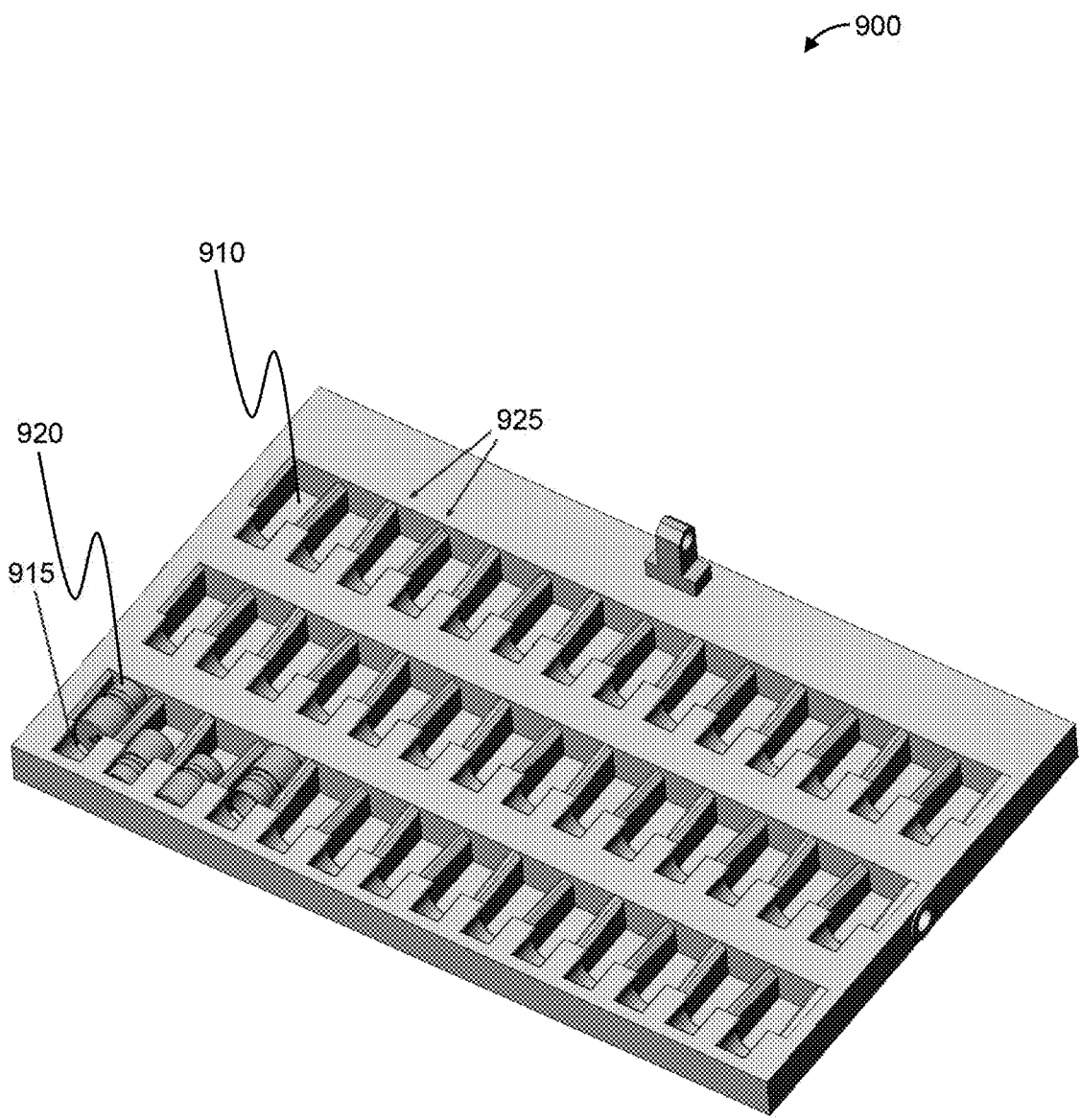
FIG. 9 illustrates, in accordance with the present disclosure, an embodiment of a part retainer with three rows showing tapered side walls.
Figure 10:
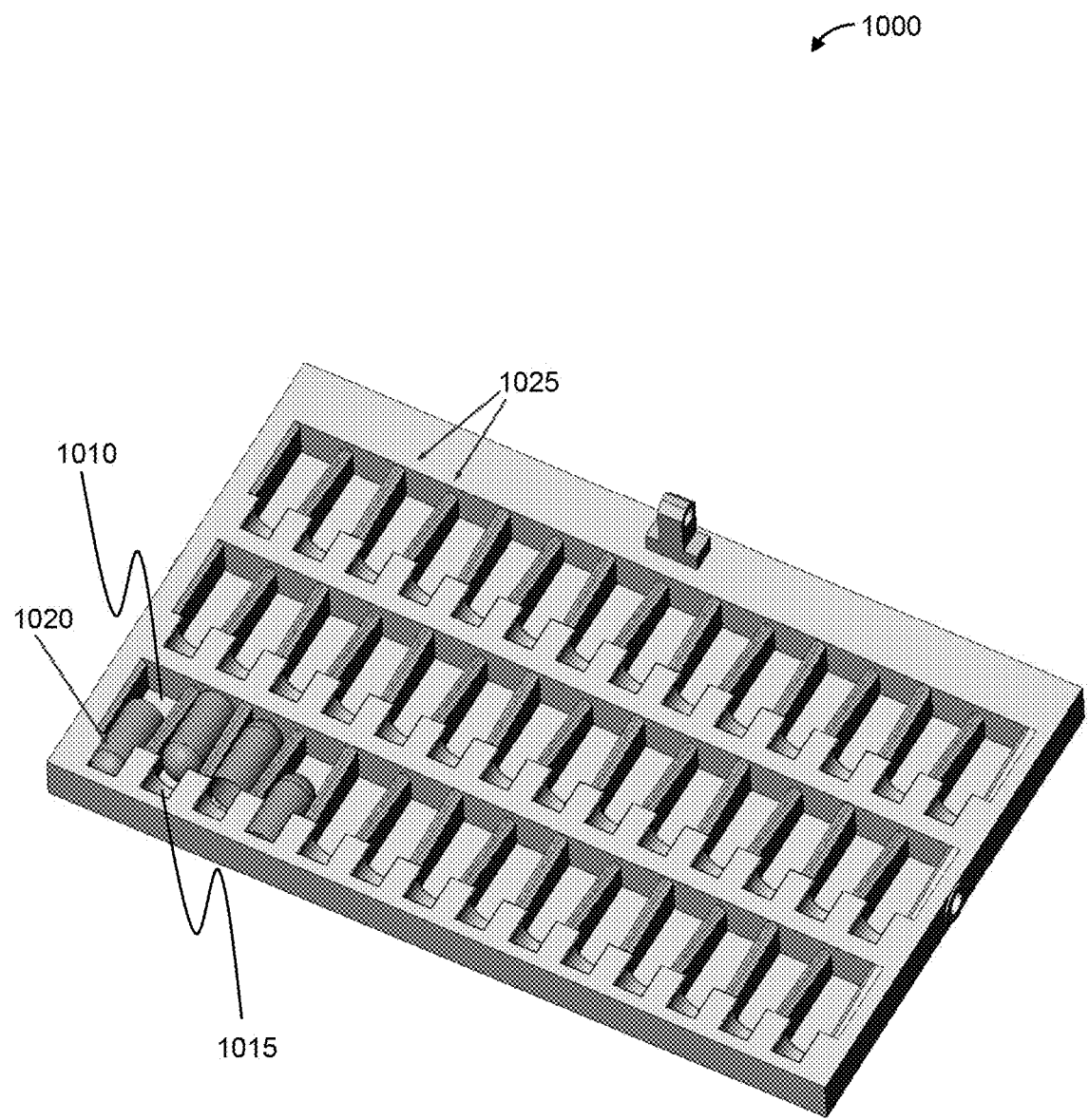
FIG. 10 illustrates, in accordance with the present disclosure, an embodiment of a part retainer with three rows showing tapered side walls with a different set of parts.

Referring now to FIGS. 8 to 10, there is shown exemplary part retainers with tapered side walls. In FIG. 8, a part retainer 800 has two rows of pockets 810 with alternating tapered side walls 825 separating the pockets 810. A part 820 is shown at rest in a pocket 810. In FIG. 9, a part retainer 900 has three rows of pockets 910 with alternating tapered side walls 925 separating the pockets 910. The pockets 910 have grooves 915 and are shaped for a certain set of parts 920. In FIG. 10, a part retainer 1000 has three rows of pockets 1010 with alternating tapered side walls 1025 separating the pockets 1010. The pockets 1010 have grooves 1015 and are shaped for a different set of parts 1020. In the part retainers shown in FIG. 8 to 10, the alternating tapered side walls may stimulate the rotation of parts that were loaded sideways onto the part retainer—the rotation may facilitate the part falling into a pocket.

Figure 11A:
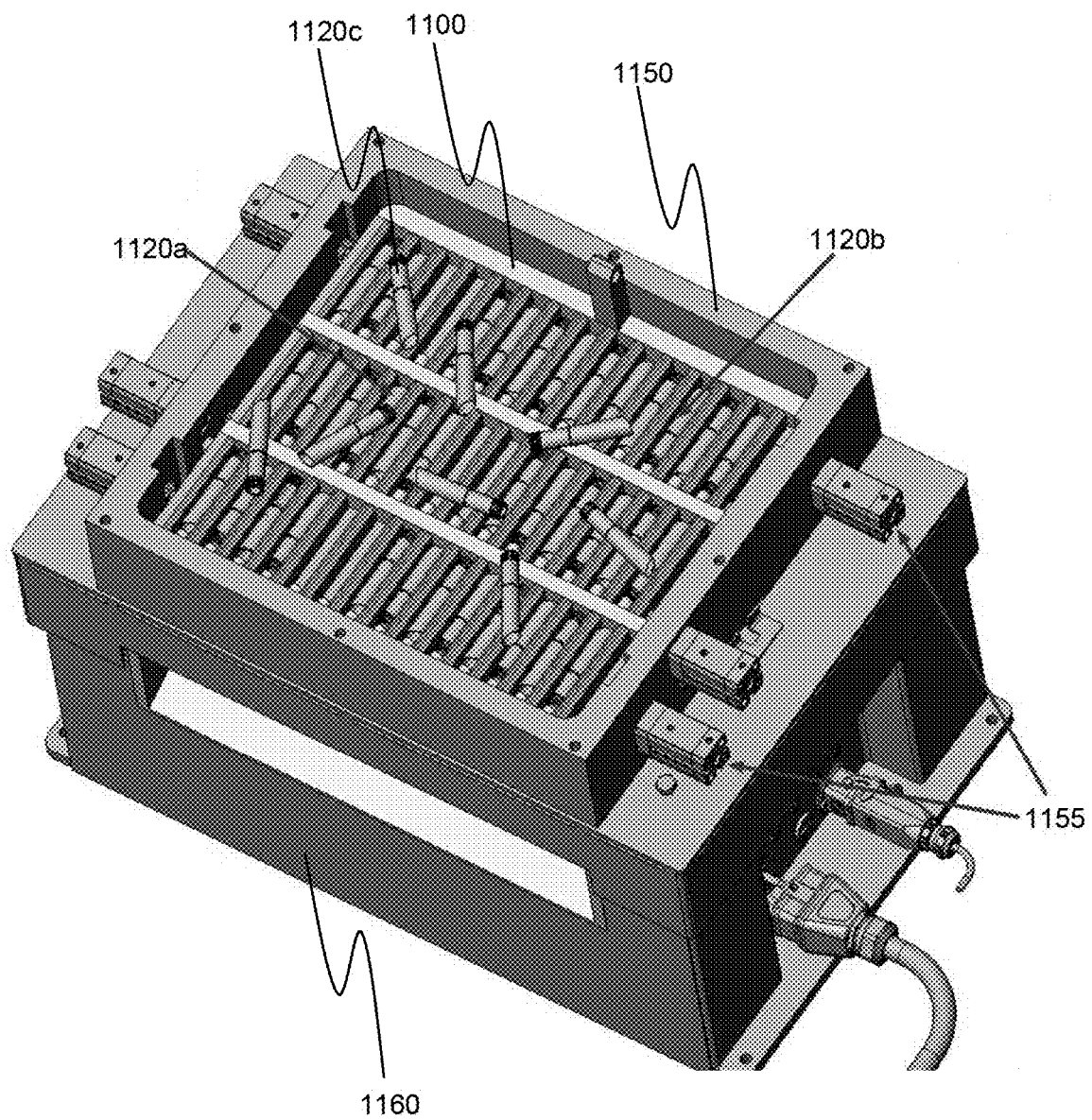
FIGS. 11A to 11F illustrate, in accordance with the present disclosure, an embodiment of a part retainer in a tilting device at various stages of tilting.
Figure 11B:
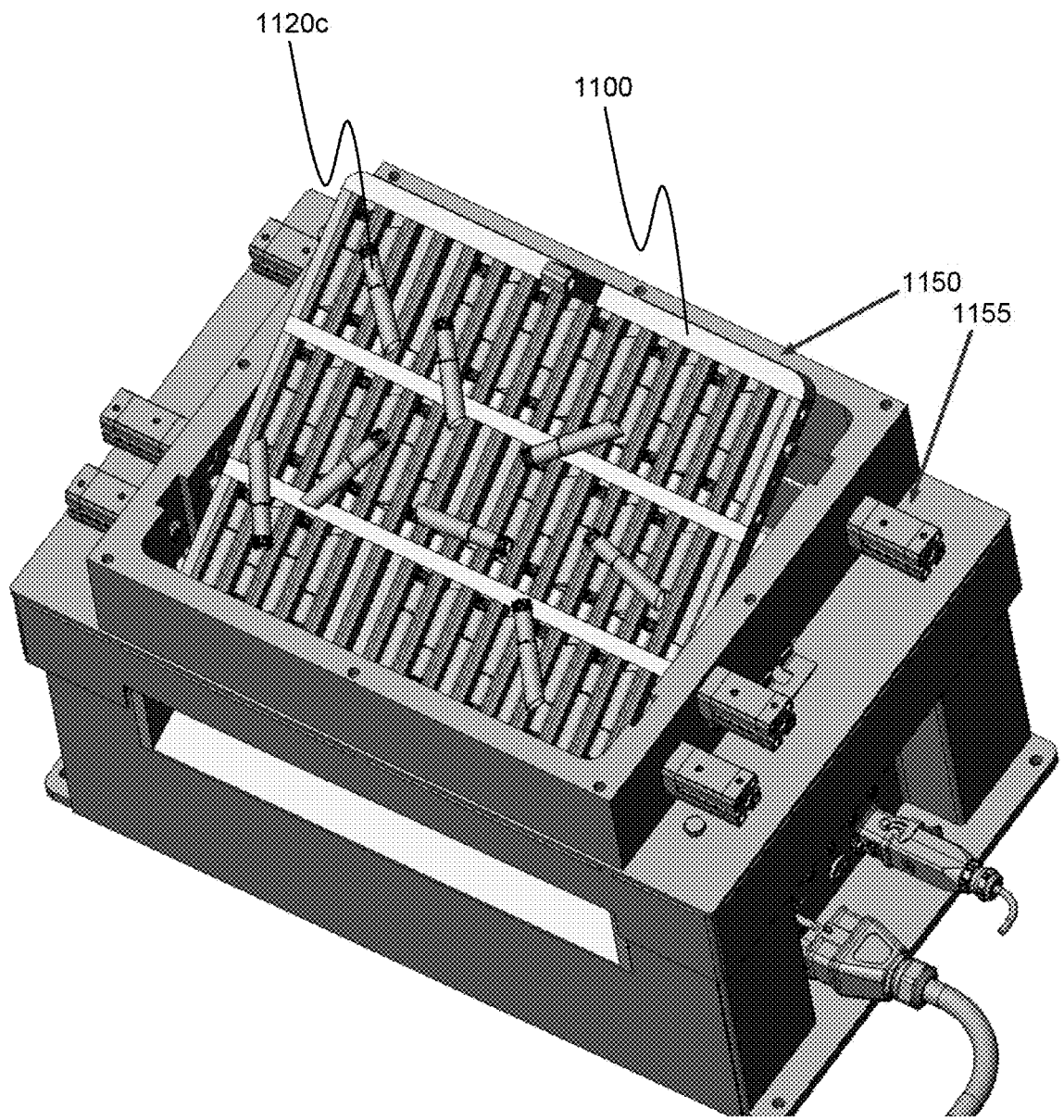
Figure 11C:
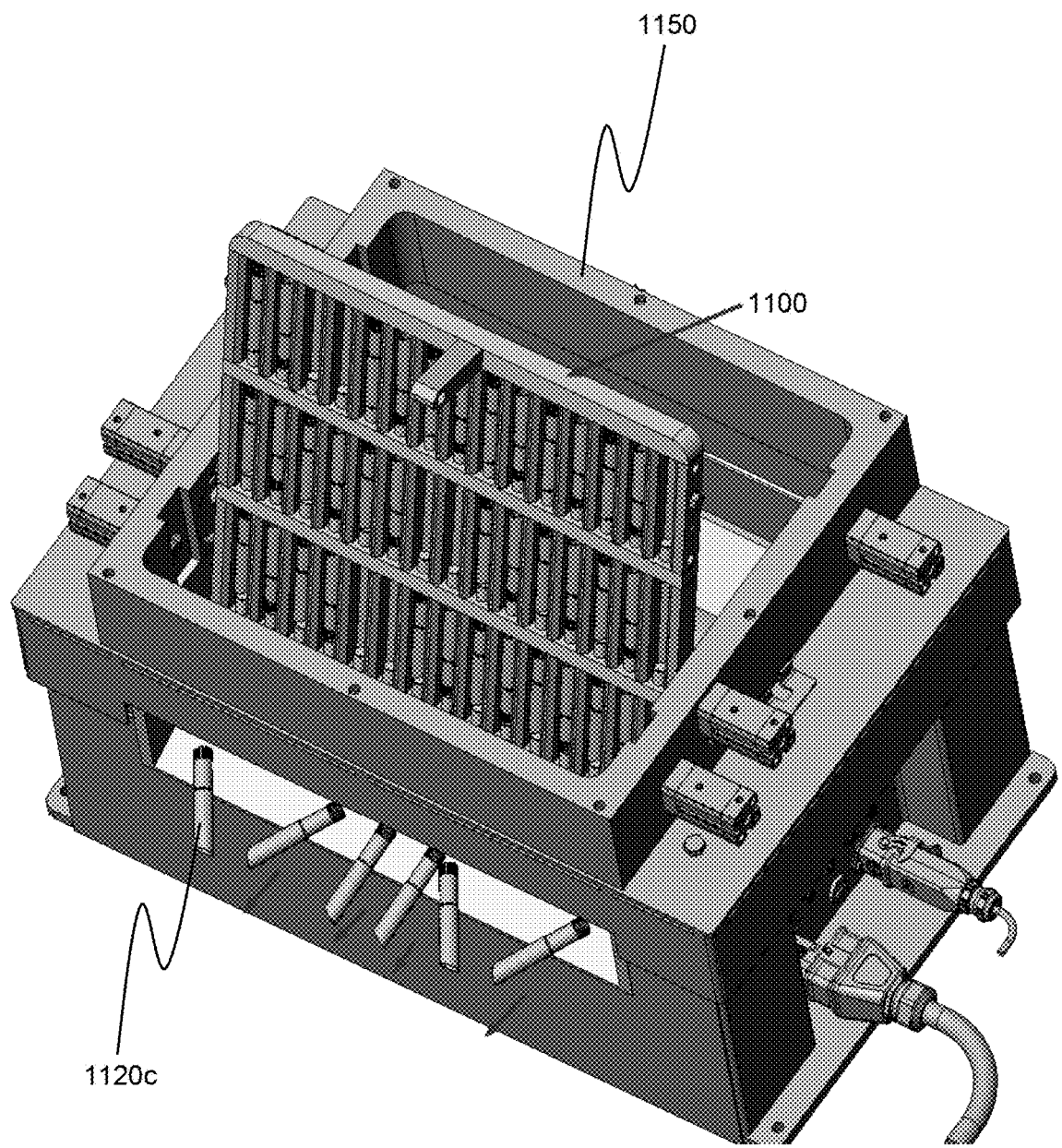
Figure 11D:
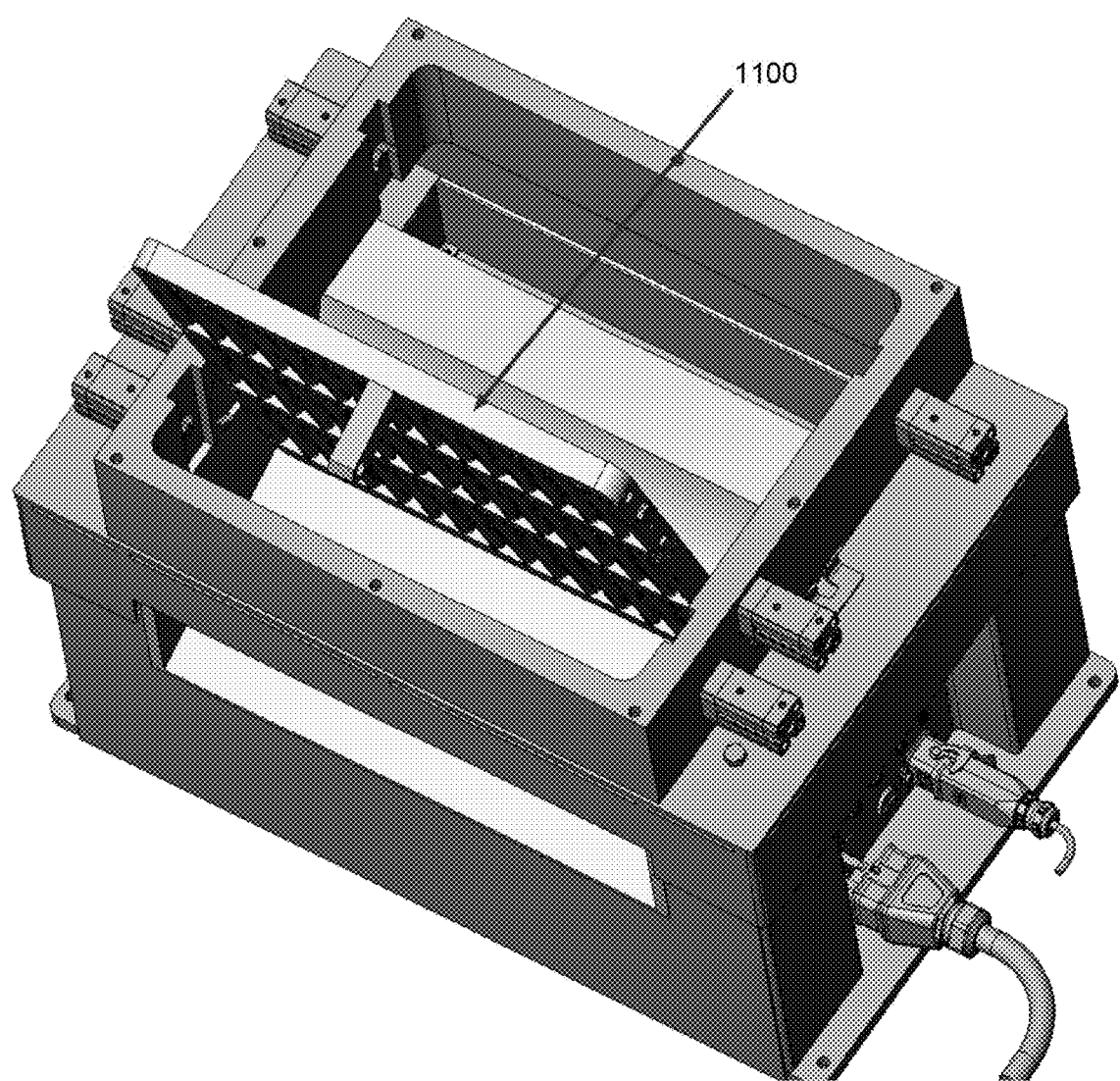
Figure 11E:
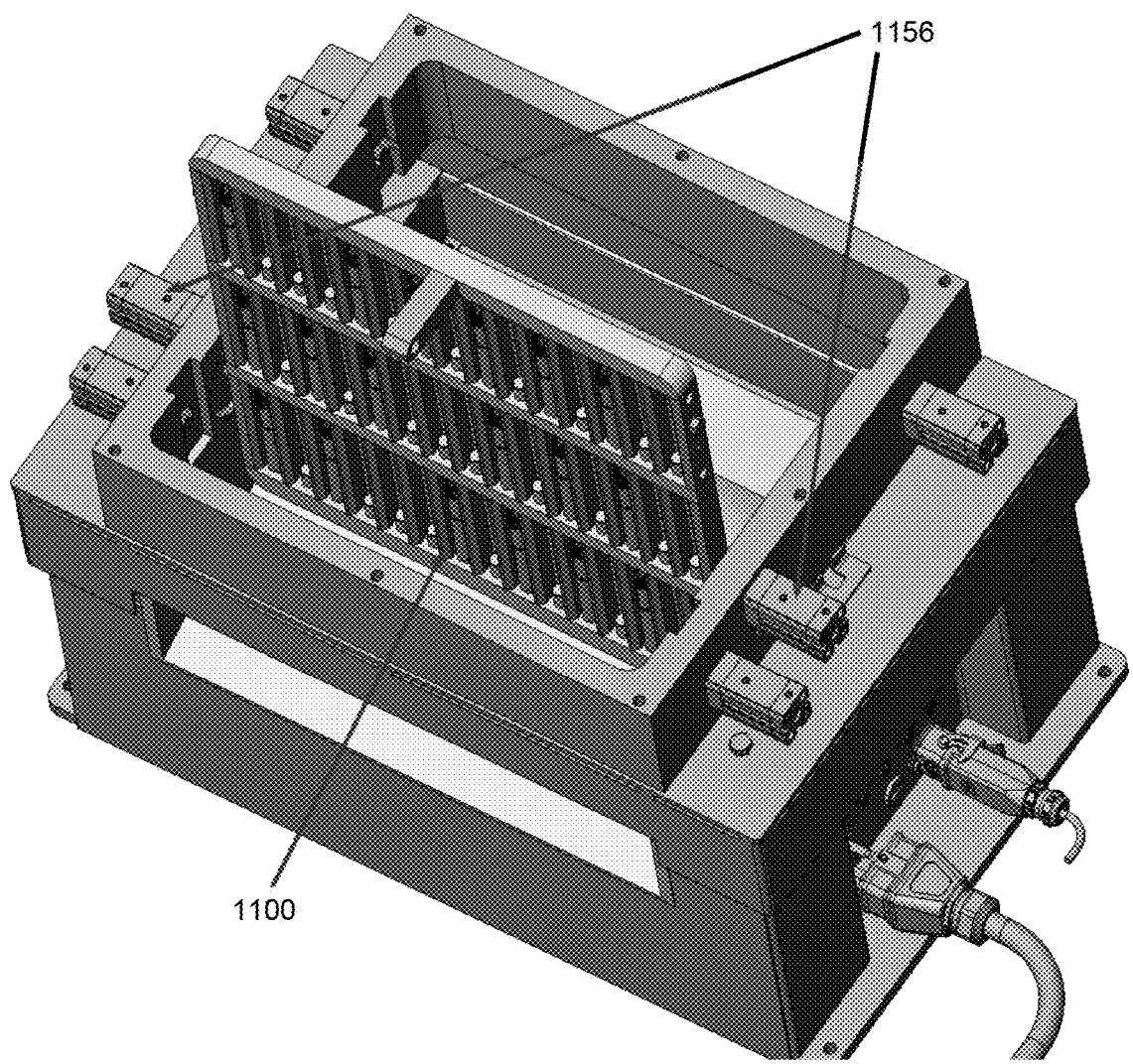
Figure 11F:
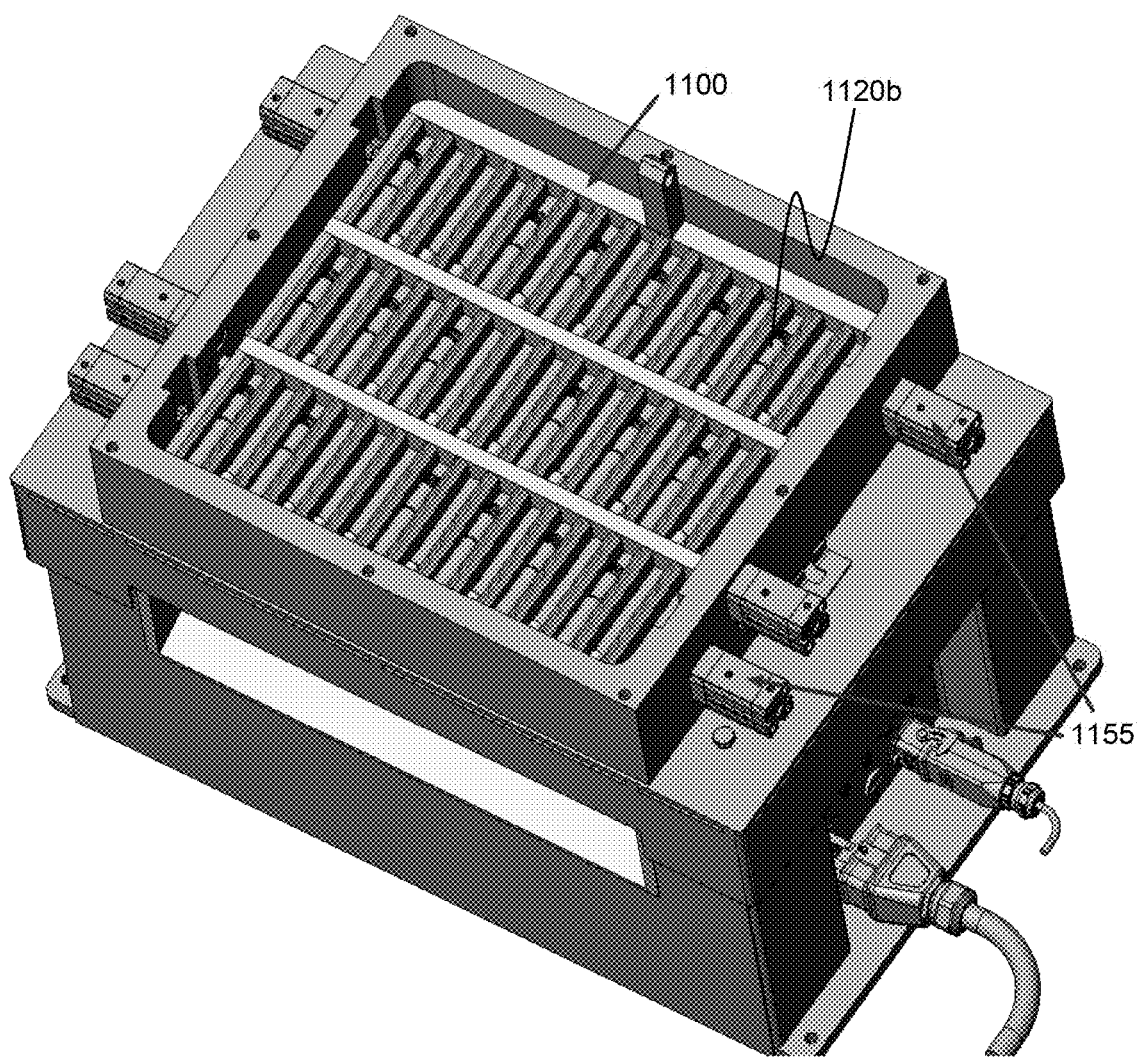

Referring now to FIGS. 11A to 11F, an exemplary part retainer 1100 in a tilting device 1150 atop a vibrator 1160, with the part retainer 1100 in various stages of tilting, is shown. The tilting device 1150 in an example of a part removal device. In FIG. 11A, the part retainer 1100 is in a horizontal position with both parts in pockets and excess parts not in pockets. For example, part 1120a is in a pocket, and part 1120b is in a pocket, while part 1120c is an excess part not in a pocket. Tilting device 1150 has horizontal stop cylinders 1155 that secure the part retainer 1100 in the horizontal position. In FIG. 11B, the part retainer 1100 is in the early stage of tilting, showing the initial location of excess parts, such as excess part 1120c. Tilting device 1150 has released the horizontal stop cylinders 1155 and tilted the part retainer 1100. In FIG. 11C, the part retainer 1100 is in the middle stage of tilting, showing excess parts spilling out below the tilting device. Excess part 1120c can be seen spilling out of a recess beneath the tilting device 1150 and onto a return conveyor (not shown). In FIG. 11D, the part retainer 1100 is in the final stage of tilting, showing no excess parts remaining. In FIG. 11E, the part retainer 1100 is locked in a vertical position. Vertical stop cylinders 1156 extend to hold the part retainer 1100 in the vertical position. In FIG. 11F, the part retainer 1100 is back to the horizontal position, showing only parts in pockets. For example, part 1120b remained in a pocket during tilting. The horizontal stop cylinders 1155 secure the part retainer 1100 in the horizontal position.

Although FIGS. 11A to 11F show an exemplary part retainer 1100 in various stages of tilting, the process may be generalized to any part retainer 101 (e.g., any one shown in FIGS. 1 to 4). In general, the number of discrete parts dispersed by disperser 101 onto part retainer 102 is of a quantity less than, equal to, or greater than the number of pockets in part retainer 102. If the number of parts is less than or equal to the number of pockets and if the applied vibrational energy is of suitable amplitude and frequency, then the longer the energy is applied, the greater the probability that all discrete parts will eventually be captured by the pockets. However, if the vibrational energy is applied for any non-infinite duration, there is a non-zero probability that one or more of the parts will not be captured by a pocket. Likewise, if the number of discrete parts is greater than the number of available pockets, then not all parts will be captured and retained by pockets, regardless of the duration with which the vibrational energy is applied. In both latter cases, the result will be one or more parts that remain within the boundaries of part retainer 102 but that is (are) not retained in (a) pocket(s). These unretained parts may be the "excess parts" referred to above.

At the conclusion of the agitation period during which vibrational energy is applied by vibrator 103 to part retainer 102, parts will be retained in none, some, or all of the pockets, and there may also be excess parts remaining within the boundaries of part retainer 102. The number of parts retained in pockets and the specific pockets that retain parts result from a stochastic process; that is, they result from statistical probability and cannot be determined in advance.

At the conclusion of the agitation period, excess parts are removed from part retainer 102 and recirculated to a receiving area of disperser 101 such that they can be dispersed again at a later time by disperser 101 onto part retainer 102. The removal of excess parts can be carried out by various means, including, but not limited to, physically removing them from part retainer 102 with a removal device; tilting part retainer 102 such that they can fall away by gravity; applying vacuum, magnetism, or some similar force such as to draw them away from part retainer 102; or applying positive air pressure such as to force them out of part retainer 102. FIGS. 11A to 11F show one method of removing parts wherein part retainer 102 is tilted such that the excess parts fall away by gravity.

After the excess parts are removed, one or more parts may remain in a corresponding number of pockets (for example, as shown in FIG. 11F). These parts are thus available for the programmable pick-and-placer 104, to obtain them from part retainer 102 by means of one or more grippers designed for that purpose. This implies that pick-and-placer 104 has the potential to obtain and hold at any one time a quantity of parts equal to the number of its grippers. However, at the conclusion of any given agitation period, discrete parts will not necessarily be retained in all pockets in part retainer 102 (for example, as shown in FIG. 11F). It is therefore understood that after the pick-and-placer 104 carries out the "pick-up" portion of its cycle, one or more of its grippers may be empty.

An example will now be provided of how part retainer 1100 (as a possible specific embodiment of part retainer 102, discussed more generally above) interacts with other components of flexible feeding device 100. In this example, part retainer 1100 has three rows of pockets. Part retainer 1100 is affixed to tilting device 1150, which sits atop vibrator 1160. Part retainer 1100 is situated below disperser 101 and along side transporter 106. Disperser 101 funnels bulk parts into a metering device (e.g., an ejectable tray). Disperser 101 ejects a metered amount of the bulk parts onto part retainer 1100. Vibrator 1160 agitates the parts on the part retainer 1100, such that a stochastically determined percentage (e.g., 60%) of the parts fall into (or are caught by) pockets. Tilting device 1150 tilts part retainer 1100, such that the parts that did not fall into pockets (e.g., 40% of the parts) spill out (e.g., onto a return conveyor). In the meantime, transporter 106 positions a first set of empty carriers 105a at a loading station (e.g., the part of the transporter 106 nearest pick-and-placer 104). Pick-and-placer 104 has 14 grippers. Pick-and-placer 104 picks up to 14 parts with its 14 grippers from a first row of pockets (e.g., the row closest to transporter 106). Pick-and-placer 104 places the up to 14 parts into a first set of empty carriers 105a. Transporter 106 takes the possibly full first set of carriers 105a to another component of flexible feeding device 100 (e.g., to carrier inspector 108). Simultaneously, transporter 106 positions a second set of empty carriers 105b at the loading station. Pick-and-placer 104 picks up to 14 parts with its 14 grippers from a second row of pockets (e.g., middle row). Pick-and-placer 104 places the up to 14 new parts into the second set of empty carriers 105b. Transporter 106 takes the possibly full second set of carriers 105b to another component of flexible feeding device 100. Simultaneously, transporter 106 positions a third set of empty carriers 105c at the loading station. Pick-and-placer 104 picks up to 14 parts with its 14 grippers from a third row of pockets (e.g., the row farthest from transporter 106). Pick-and-placer 104 places the up to 14 new parts into the third set of empty carriers 105c. Transporter 106 takes the possibly full third set of carriers 105c to another component of flexible feeding device 100.

In this example of how part retainer 1100 interacts with other components of flexible feeding device 100, the various components may be scaled and/or their operating periods may be lengthened or synchronized to help increase output. One possible way to increase output may be achieved by increasing the quantities of pockets (e.g., four rows rather than three and/or ten pockets per row rather than five) in the part retainer 102 and/or key elements of the pick-and-placer 104 (e.g., adding a second set of grippers and picking up two rows at a time rather than one). Another possible way to increase output is to have disperser 101 funnel bulk parts into the metering device at the same time that pick-and-placer 104 picks up to 14 parts from the second row of pockets. Another possible way is to have disperser 101 eject the metered amount of the bulk parts onto part retainer 1100 at the same time that pick-and-placer 104 places the up to 14 new parts into the second set of empty carriers 105b. Another possible way is to have vibrator 1160 agitate the parts on the part retainer 1100 at the same time that transporter 106 positions the first set of empty carriers 105a at the loading station. Another possible way is to have tilting device 1150 tilt part retainer 1100 at the same time that transporter 106 takes the possibly full set of carriers 105b to another component of flexible feeding device 100.

Figure 12A:
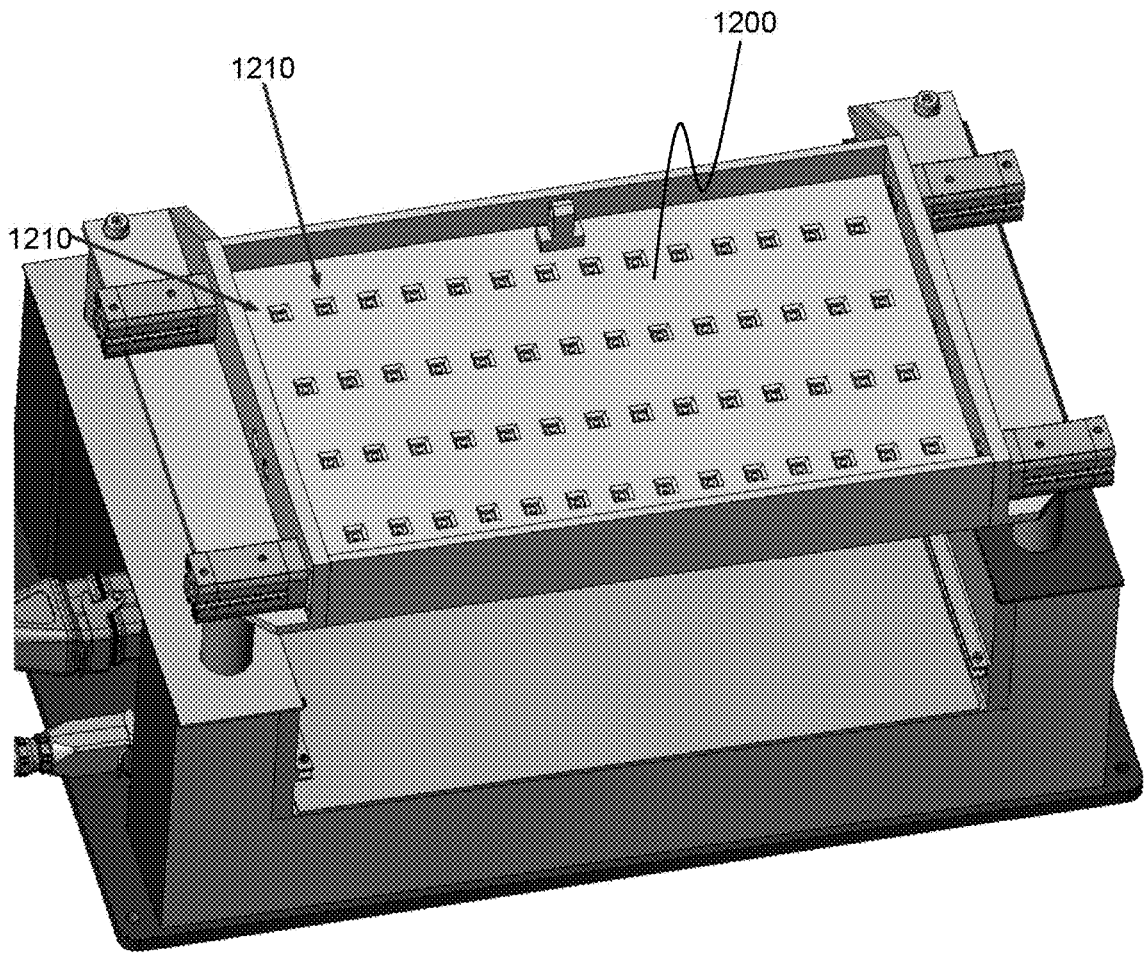
FIG. 12A illustrates, in accordance with the present disclosure, an embodiment of a part retainer with knob-shaped pockets.
Figure 12B:
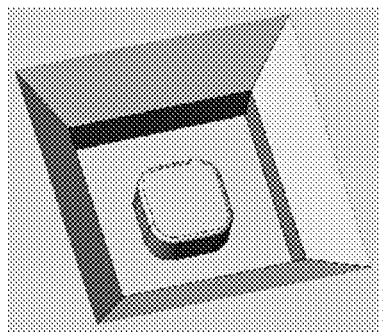
FIG. 12B illustrates, in accordance with the present disclosure, a close-up view of an embodiment of a knob-shaped pocket.

Referring now to FIGS. 12A to 12B, an exemplary part retainer 1200, with knob-shaped pockets, is shown. FIG. 12A shows part retainer 1200 with all the knob-shaped pockets 1210 empty. FIG. 12B shows a close-up view of a knob-shaped pocket 1210.

Figure 13A:
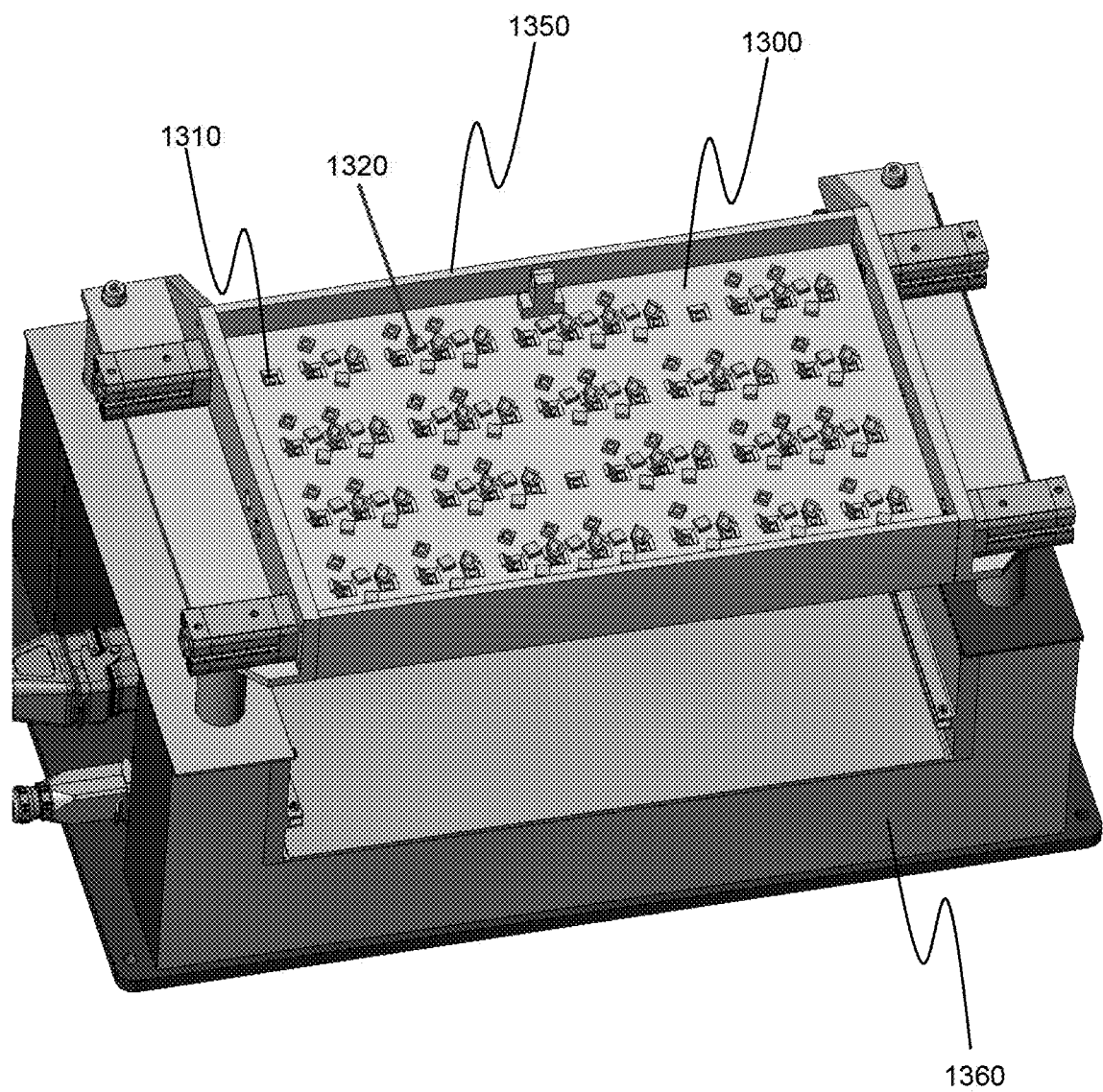
FIGS. 13A to 13H illustrate, in accordance with the present disclosure, an exemplary part retainer at various stages of operation atop a vibrating device.
Figure 13B:
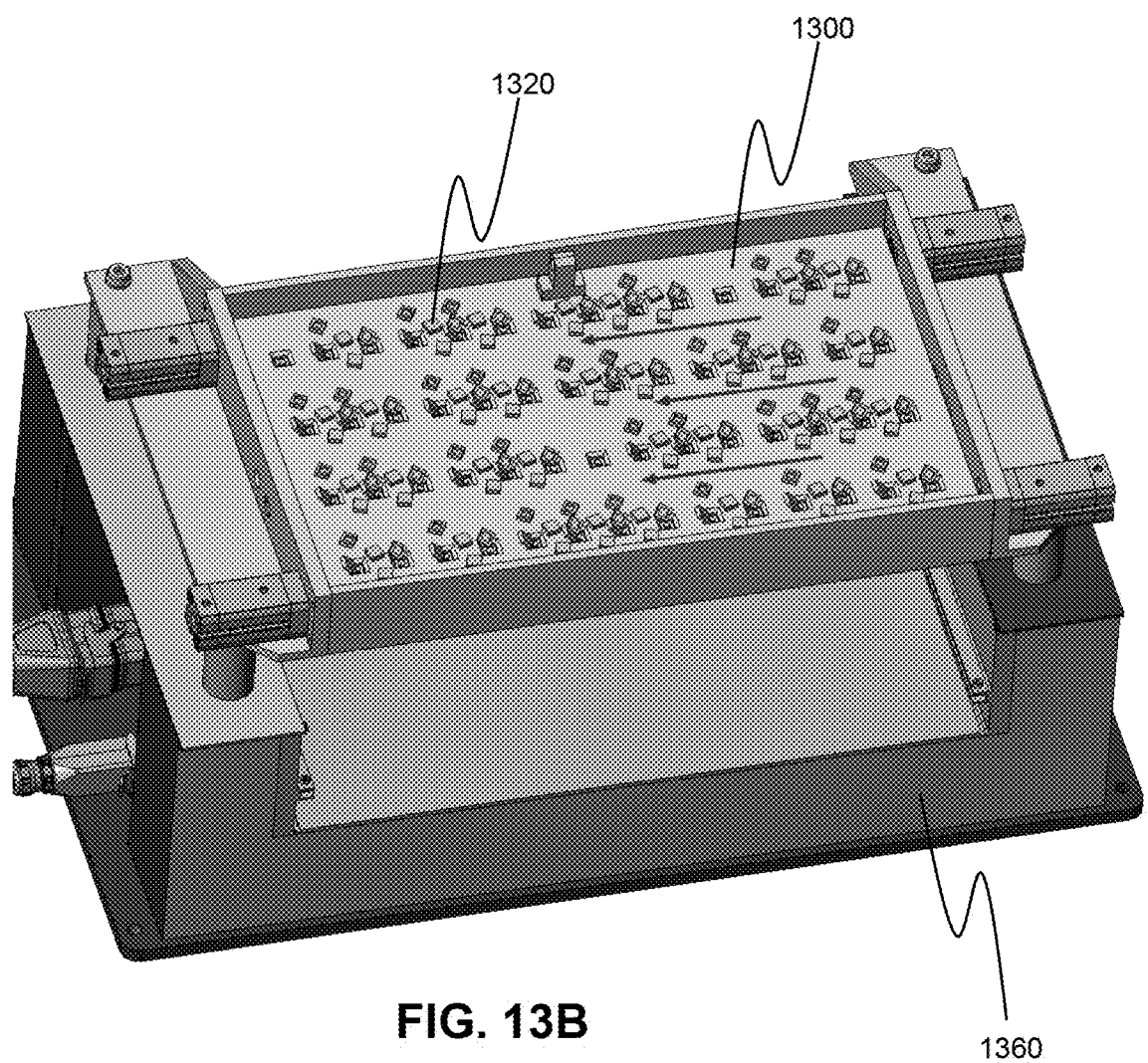
Figure 13C:
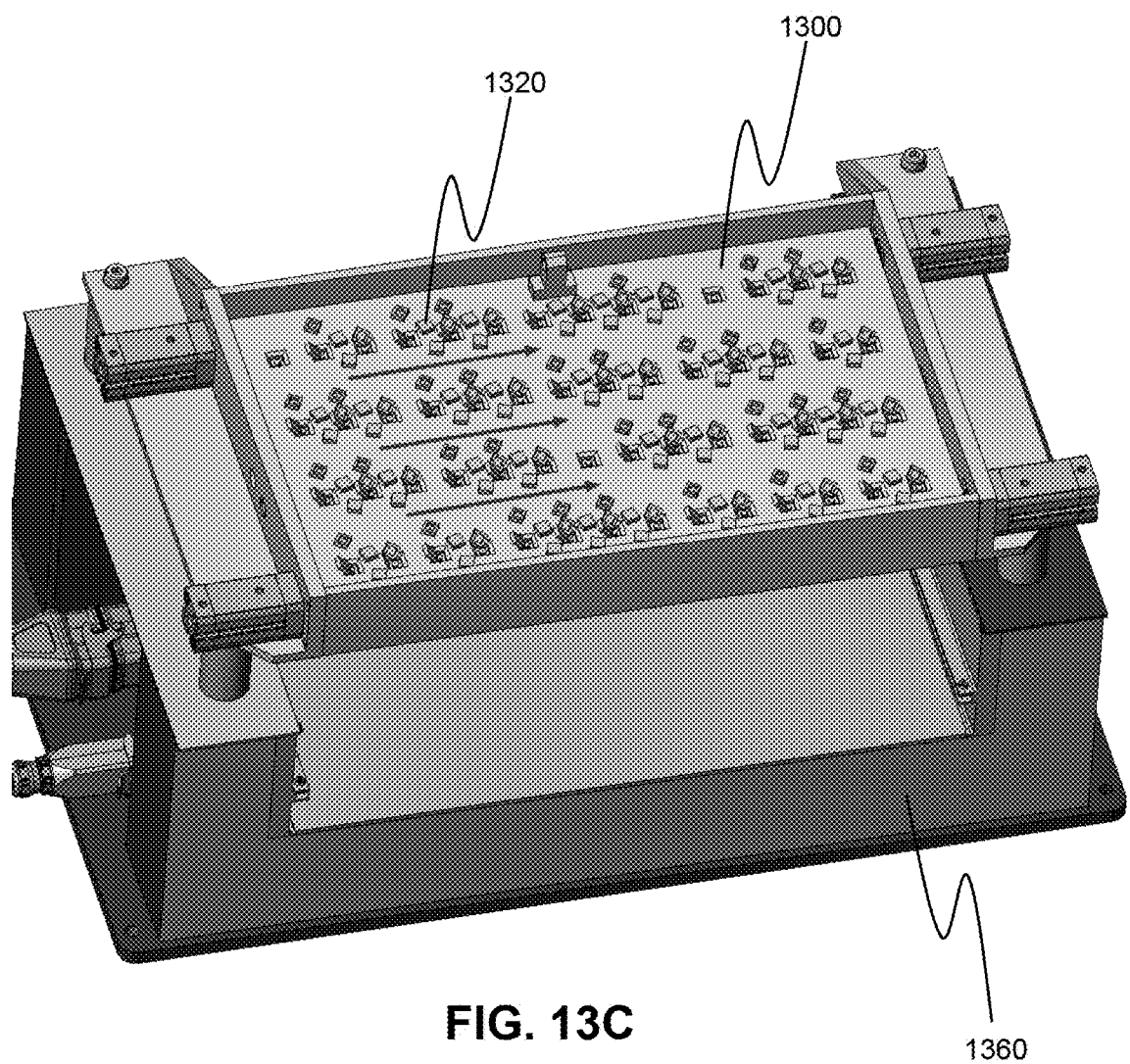
Figure 13D:
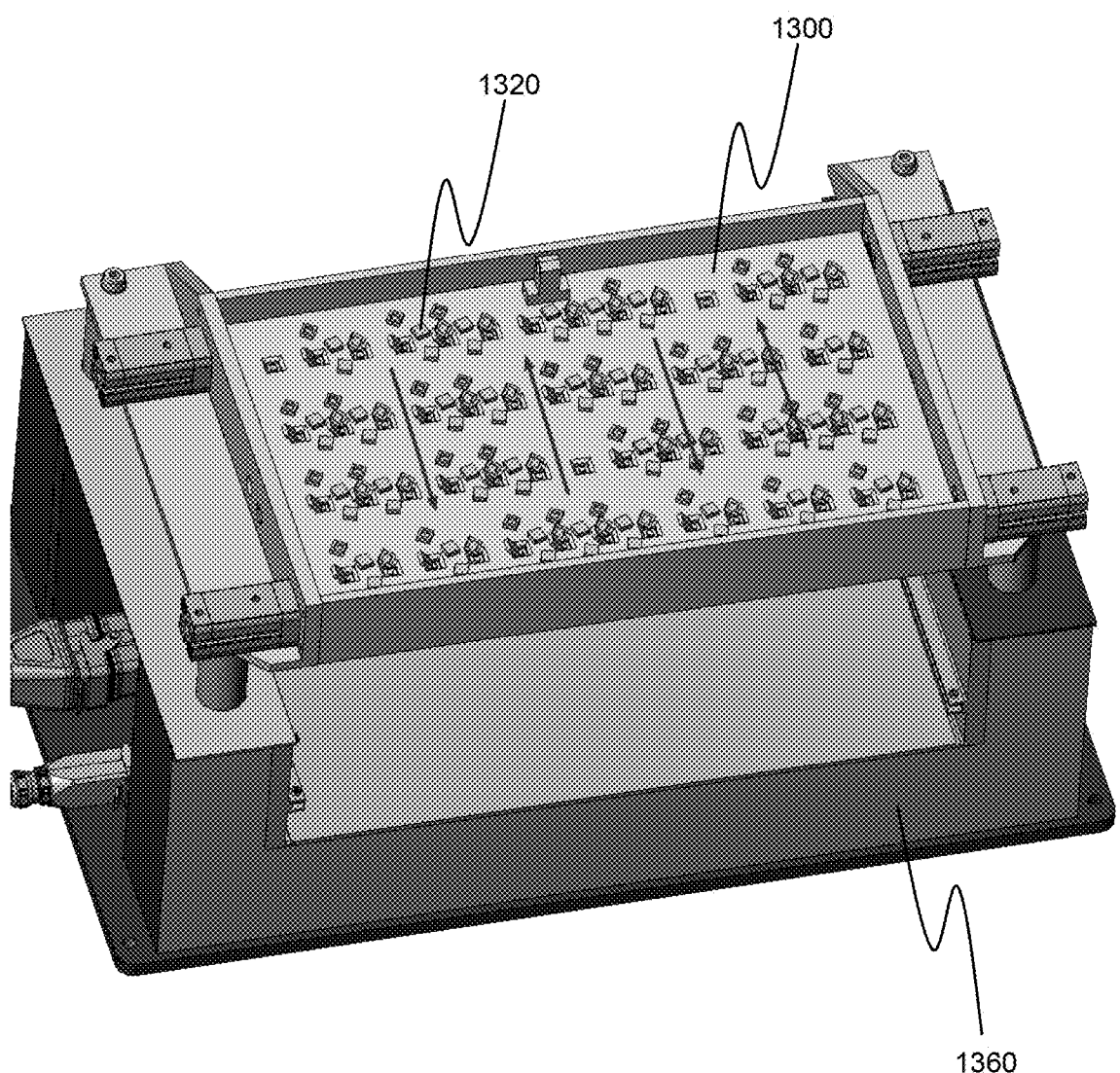
Figure 13E:
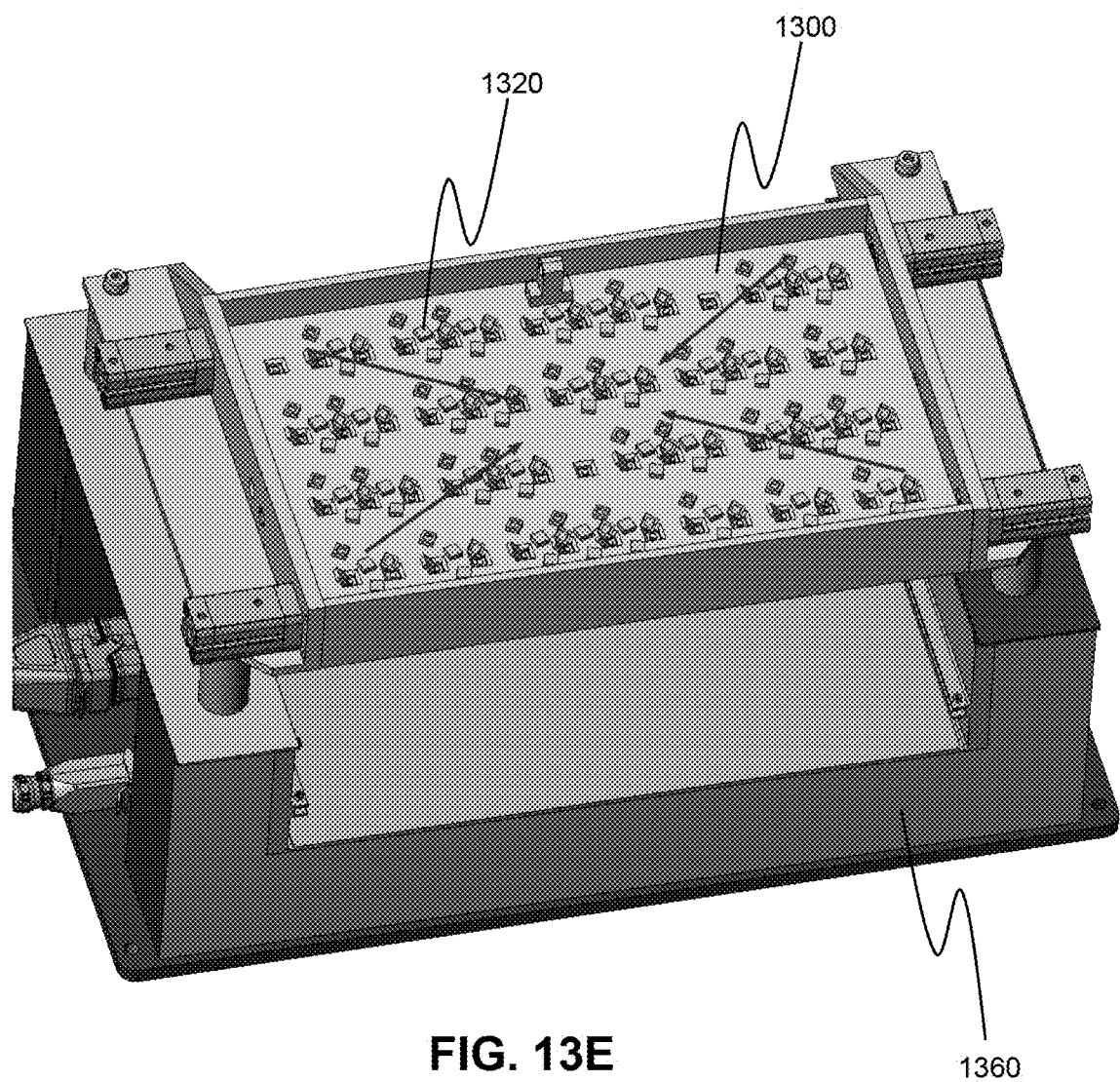
Figure 13F:
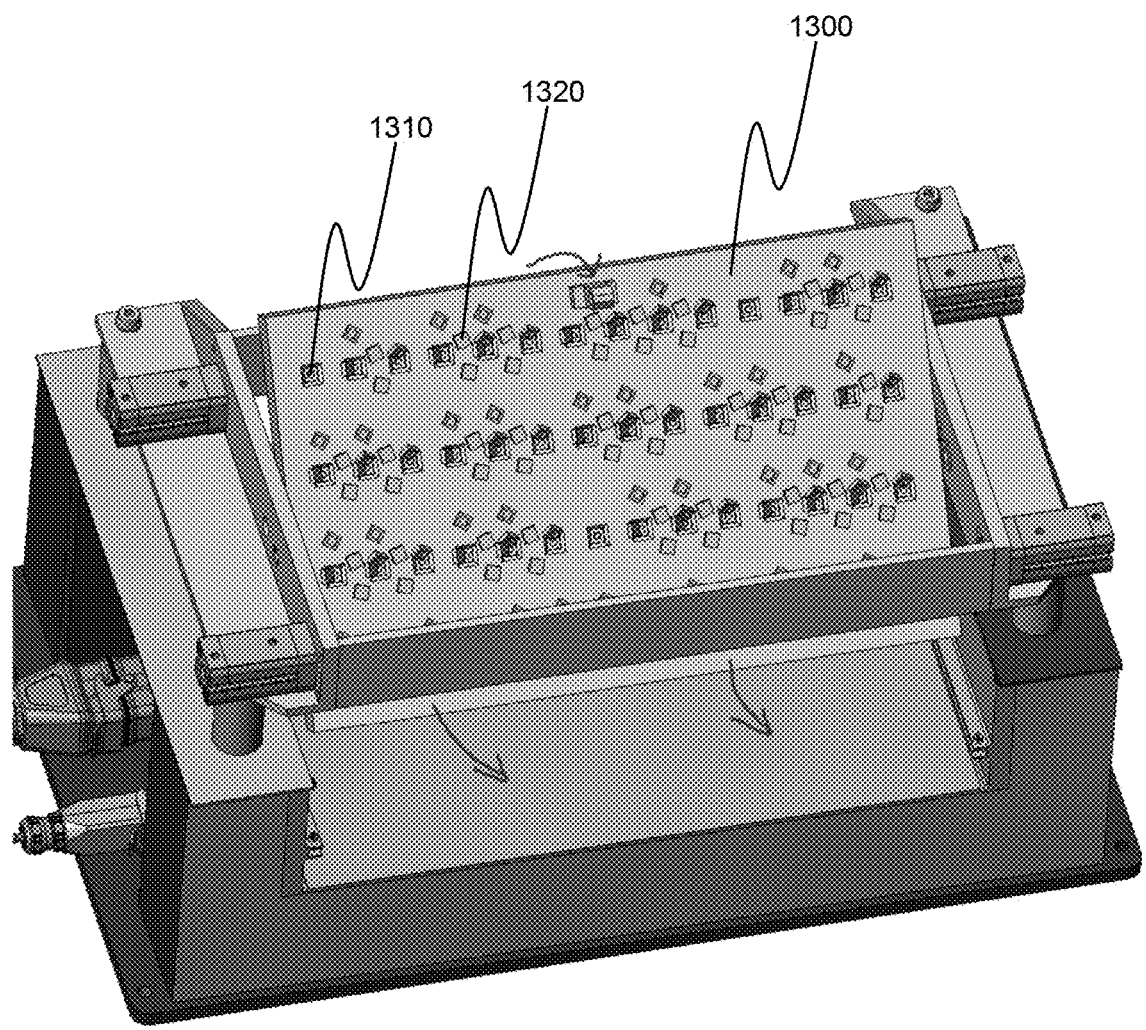
Figure 13G:
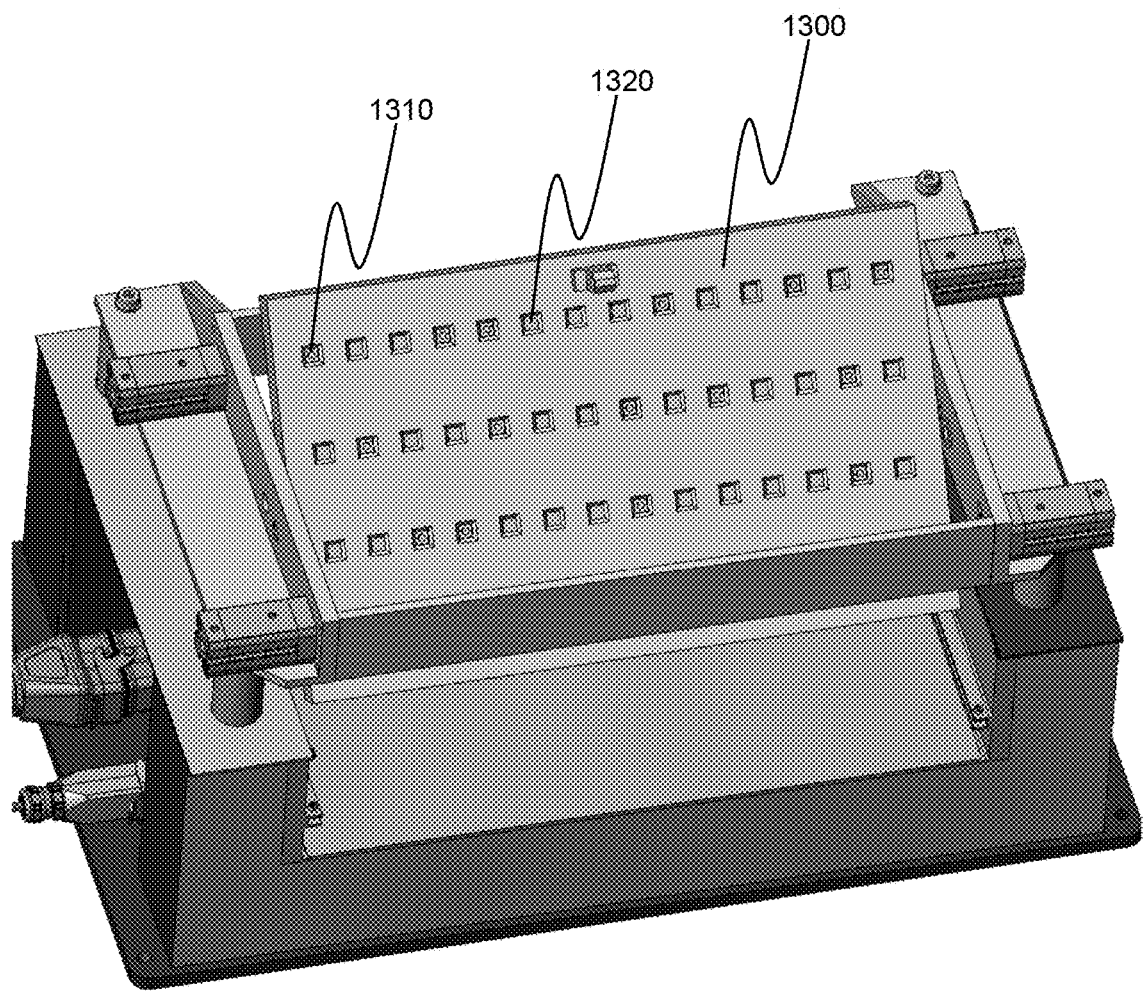
Figure 13H:
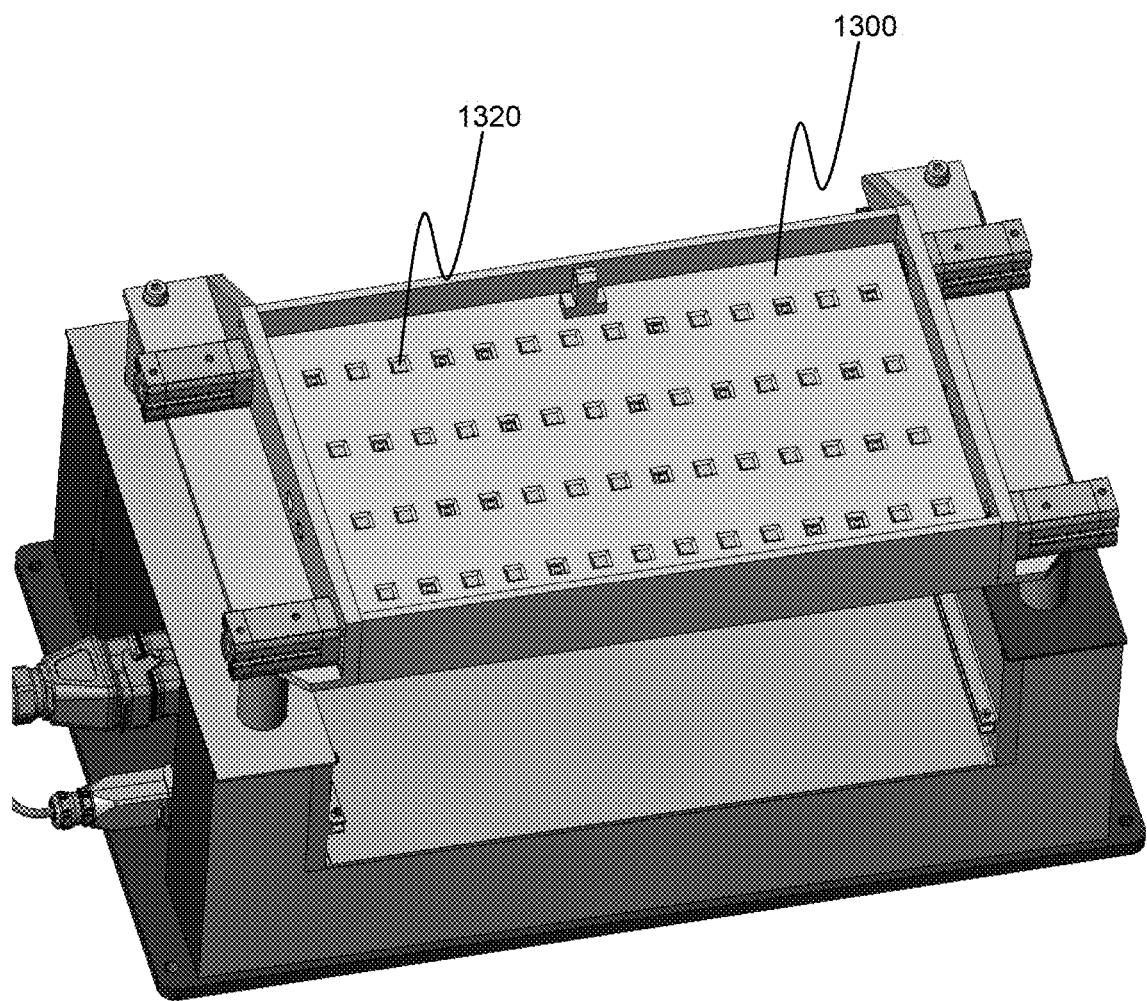

Referring now to FIGS. 13A to 13H, an exemplary part retainer 1300 in a tilting device 1350 atop a vibrator 1360, at various stages of operation, is shown. FIG. 13A illustrates the part retainer 1300 having knob-shaped pockets 1310 (which may be the same one shown in FIG. 12A), showing knobs 1320 after being dumped onto the part retainer 1300. FIG. 13B illustrates part retainer 1300 with the vibrator 1360 moving the knobs 1320 on the part retainer 1300 from right to left (shown by arrows). FIG. 13C illustrates part retainer 1300 with the vibrator 1360 moving the knobs 1320 on the part retainer 1300 from left to right (shown by arrows). FIG. 13D illustrates part retainer 1300 with the vibrator 1360 moving the knobs 1320 on the part retainer 1300 across and back (shown by arrows). FIG. 13E illustrates part retainer 1300 with the vibrator 1360 moving the knobs 1320 on the part retainer 1300 toward the center and back (shown by arrows). FIG. 13F illustrates part retainer 1300 tilted to dump knobs 1320 that did not enter a pocket 1310. FIG. 13G illustrates part retainer 1300 tilted with some knobs 1320 retained in a pocket (the pocket not visible when filled), while some pockets 1310 are empty. FIG. 13H illustrates part retainer 1300 returned to the horizontal position for unloading of knobs 1320.

Figure 14:
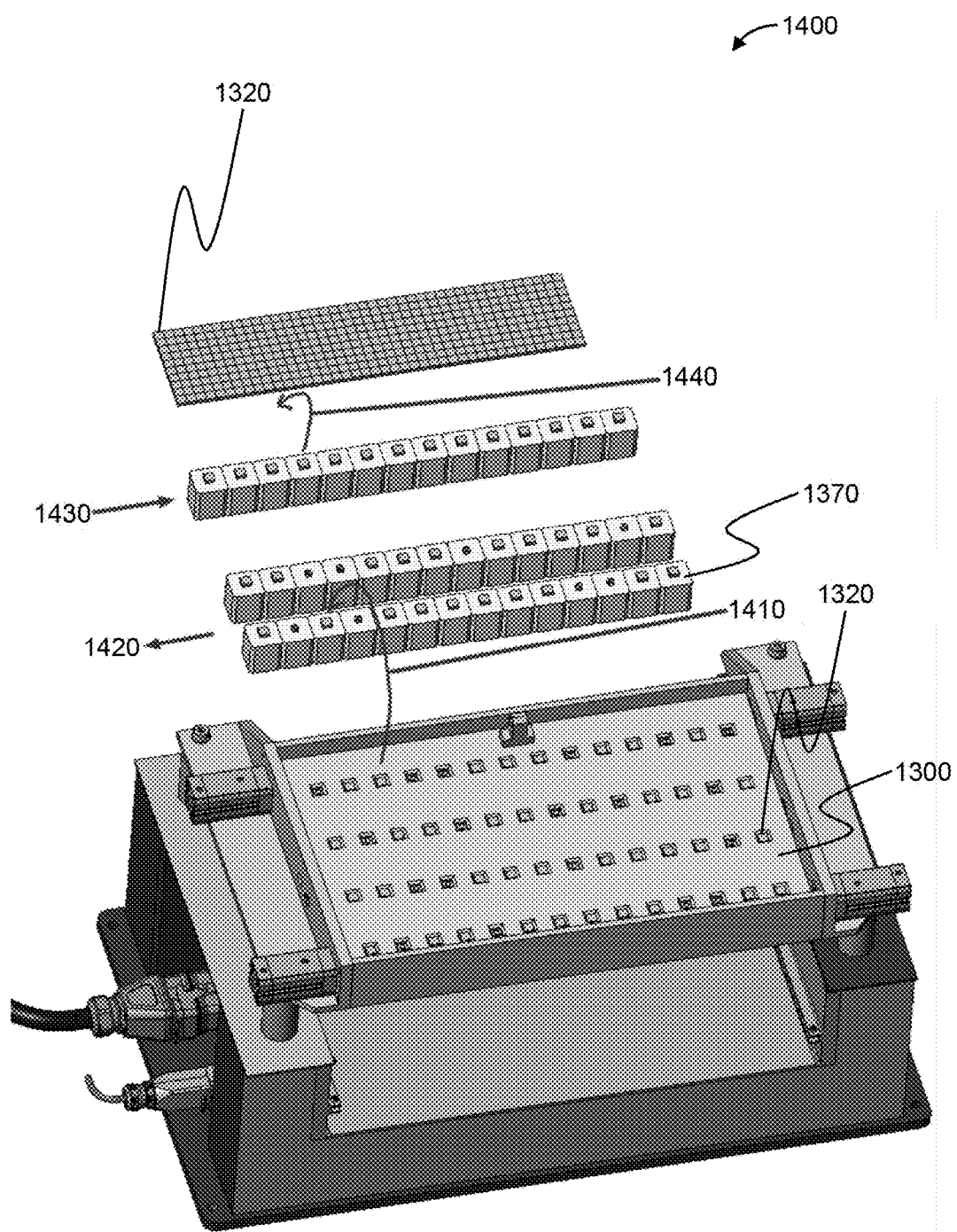
FIG. 14 illustrates, in accordance with the present disclosure, an embodiment of a progression of high-output flexible feeding of knobs.

Referring now to FIG. 14, an exemplary progression of high-output flexible feeding 1400, of knobs retained in the pockets of a part retainer with knob-shaped pockets, in accordance with FIG. 1 and FIGS. 13A to 13H, is shown. Pick-and-placer 104 (not shown) picks knobs 1320 from the part retainer 1300 and places them on pucks 1370 (as indicated by arrow 1410). The pucks 1370 travel to a carrier inspection disc 107 (not shown) to separate empty pucks 1370 (as indicated by arrow 1420). Full pucks 1370 travel back to a tray load location (as indicated by arrow 1430). Pick-and-placer 104 picks knobs 1320 from the pucks 1370 and places them on a tray (as indicated by arrow 1440). Pucks may be, for example, about three times the pitch of the tray. In that case, stopping at three locations allows aligning pucks with all tray locations to completely fill the tray.

Figure 15:
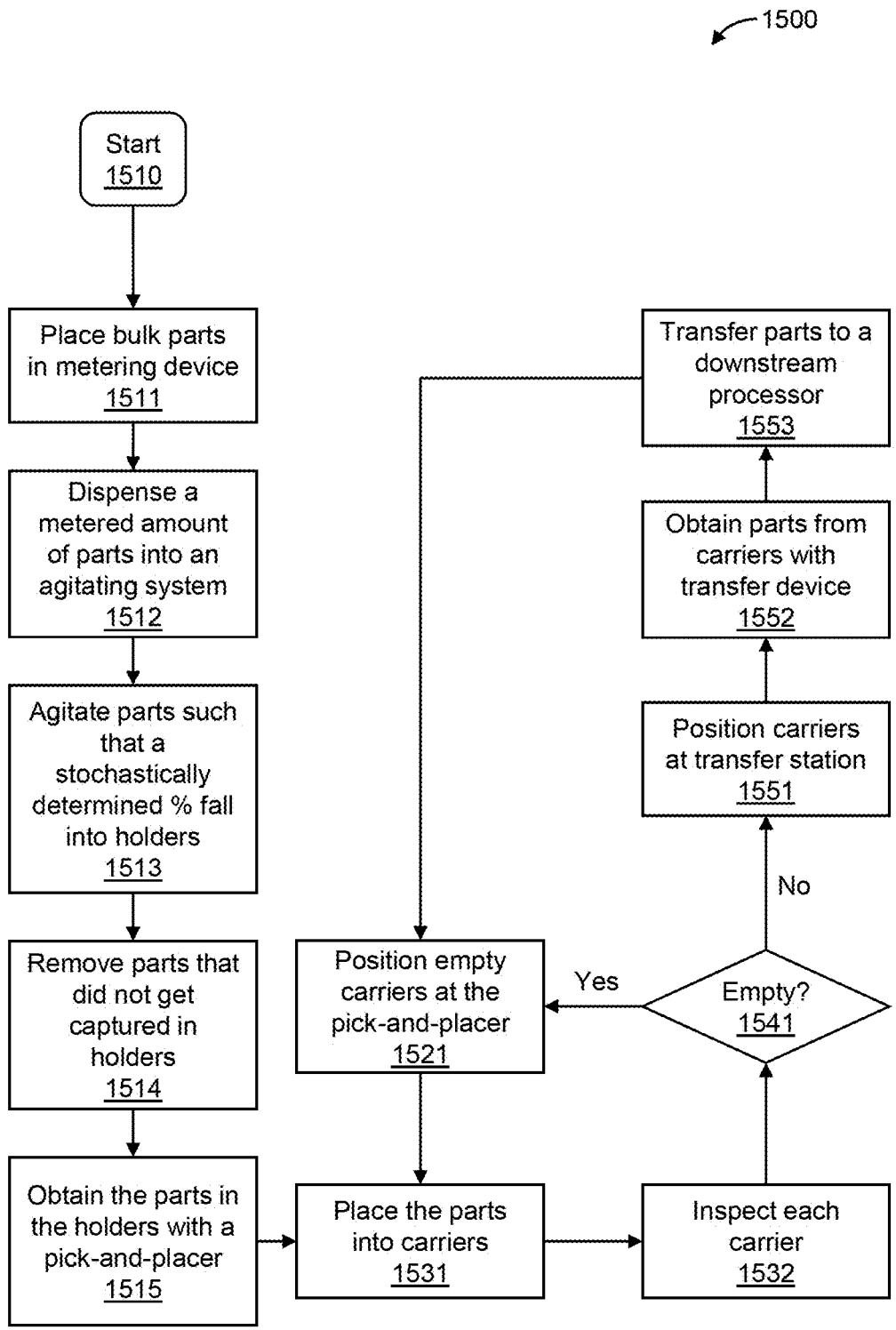
FIG. 15 shows, in accordance with the present disclosure, an embodiment of a flow diagram of a method of high-output flexible feeding.

Referring now to FIG. 15, an exemplary flow diagram of a method of high-output flexible feeding 1500, is shown. At block 1510, the method starts. At block 1511, a disperser 101 places bulk discrete parts in a metering device. At block 1512, disperser 101 dispenses a metered amount of parts into an agitating system, such as a part retainer 102 in communication with a vibrator 103. At block 1513, vibrator 103 agitates parts such that a stochastically determined percentage falls into holders (e.g., pockets). At block 1514, an excess part removal device 150 (e.g., a tilting device) removes the parts that did not get captured in the holders. At block 1515, a pick-and-placer 104 obtains the parts in the holders. At block 1521, a transporter 106 positions empty carriers (e.g., pucks) at the pick-and-placer 104. At block 1531, pick-and-placer 104 places the parts into the carriers. At block 1532, a carrier inspector 108 inspects each carrier. At block 1541, carrier inspector 108 checks if the carrier is empty. If Yes, then go to block 1521. If No, then go to block 1551. At block 1551, transporter 106 positions the carriers at a transfer station 111. At block 1552, a transfer device 114 obtains the parts from the carriers. At block 1553, the parts are transferred by the transfer device 114 to a downstream processor. After processing, the downstream processor returns the empty carriers to the transporter 106 for delivery back to the pick-and-placer 104.

Method 1500 provides one example of high-output flexible feeding that can be carried out by exemplary flexible feeding device 100. The following paragraphs provide additional details on how method 1500 can be carried out with reference to flexible feeding device 100; however, method 1500 may also be carried out on similar devices with analogous parts.

At block 1521, transporter 106 can deliver carriers 105 to an area proximate to both part retainer 102 and pick-and-placer 104 such that pick-and-placer 104 can place its cargo of discrete parts into the carriers 105 after obtaining them from the holders in part retainer 102. At blocks 1515 and 1531, pick-and-placer 104 can have one or more grippers. Since not necessarily all the grippers of pick-and-placer 104 obtain a part, not necessarily all carriers 105 receive a part when pick-and-placer 104 executes the placement of its cargo into the carriers 105.

At block 1515, pick-and-placer 104 can obtain the available parts from the holders of part retainer 102 either all at once or in successive motions. Likewise, at block 1531, pick-and-placer 104 can transfer the obtained parts to the carriers 105 all at once or through a series of successive motions of part retainer 104 and/or of the carriers 105. Typically, the more parts that can be obtained from part retainer 102 and placed into the carriers 105 at one time, the more advantageous to the overall output of the flexible feeding device 100.

In a particular case, block 1515 is divided into sub-blocks, 1515a and 1515b, where pick-and-placer 104 obtains available parts from the holders of part retainer 102 in two separate motions. For example, part retainer 102 has two rows of pockets, and pick-and-placer 104 has five grippers. At block 1515a, pick-and-placer 104 picks up to five parts from a first row (e.g., the row farthest from the metering device). At block 1515b, pick-and-placer 104 picks up to five parts from a second row (e.g., the row closest to the metering device). Block 1515a and block 1515b may be successive, or they may be (e.g., logically or chronologically) separated by other blocks.

The carriers 105 may have physical features that engage them to transporter 106 and physical features that allow them to hold and carry one or more of the discrete parts. The latter physical features can be supplemented by additional mechanical, electrical, pneumatic, or magnetic elements as may be necessary to retain the part(s) in the carrier 105.

At block 1532, the carriers 105 can proceed to carrier inspection disc 107 for inspection by carrier inspector 108. The inspection can proceed as follows. Any carrier 105 that is determined not to contain a part(s) in a manner that can be used by a downstream processor has the unusable part(s) removed by part remover 109 and is redirected by gate 110 to return within the range of pick-and-placer 104. Similarly, any carrier 105 that is determined by carrier inspector 108 to be empty is redirected by gate 110 so as to eventually return within the range of pick-and-placer 104. Any carrier 105 that is determined by carrier inspector 108 to contain part(s) that can be used by a downstream processor is directed by gate 110 toward that operation.

Carriers 105 that are delivered to downstream processor can have their cargo removed at the downstream processor and can then be recirculated by the transporter 106 so as to eventually return within the range of pick-and-placer 104.

In method 1500, actions carried out at different blocks may be timed or synchronized to help increase output. One possible way is synchronize blocks 1511 and 1515b to have disperser 101 funnel bulk parts into the metering device at the same time that pick-and-placer 104 picks up to five parts from the second row of pockets. Another possible way is to synchronize blocks 1512 and 1531 to have disperser 101 eject the metered amount of the bulk parts onto part retainer 1100 at the same time that pick-and-placer 104 places the up to five new parts into a set of empty carriers 105. Another possible way is to synchronize block 1513 and 1521 to have vibrator 1160 agitate the parts on the part retainer 1100 at the same time that transporter 106 positions a different set of empty carriers 105 at the loading station. Another possible way is to synchronize blocks 1514 and 1532 to have tilting device 1150 tilt part retainer 1100 at the same time that carrier inspector 108 inspects carriers 105.

Figure 16:
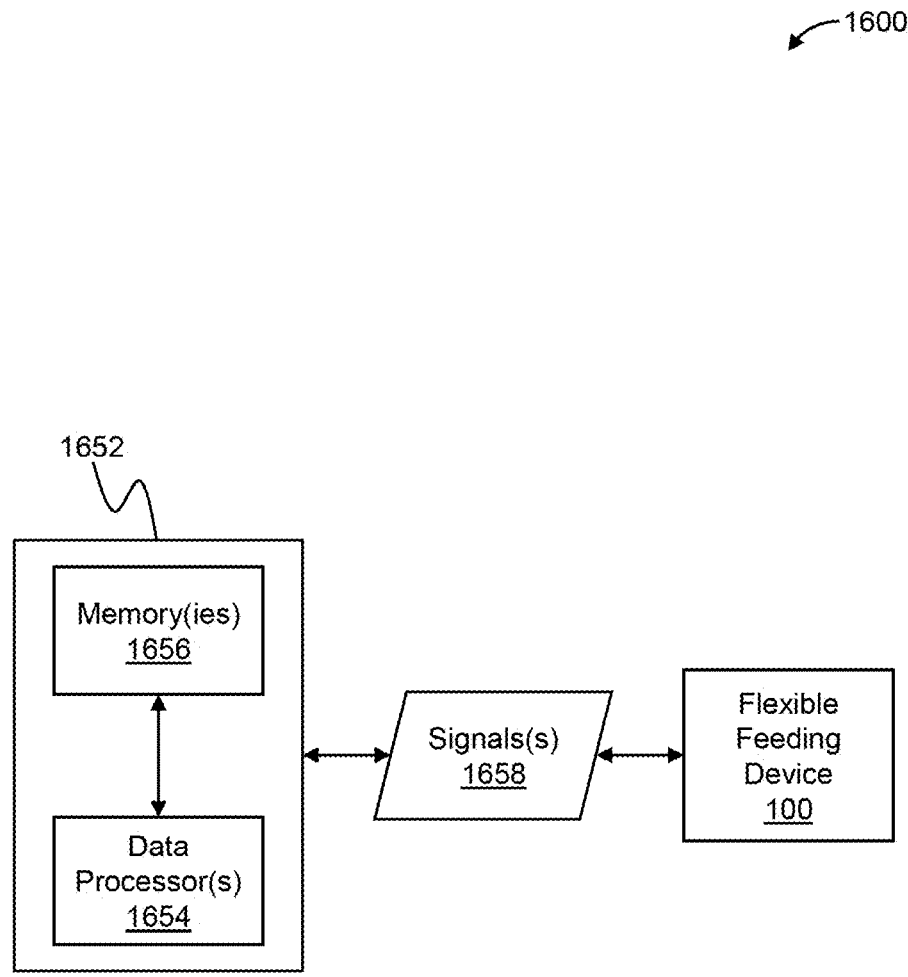
FIG. 16 shows, in accordance with the present disclosure, a schematic representation of an embodiment of a system of high-output flexible feeding.

Referring now to FIG. 16, a schematic representation of an exemplary system of high-output flexible feeding 1600, is shown. System 1600 comprises a flexible feeding device 100. System 1600 comprises one or more control devices 1652 (referred hereinafter as "controller 1652"), which may be used to implement computer numerical control (CNC)—software control—for the system 1600. Controller 1652 may comprise one or more data processors 1654 (referred to hereinafter as "data processor 1654") and related accessories that enable control of at least some aspects of performance of flexible feeding device 100. Data processor 1654 may, for example, be configured to make decisions regarding the control and operation of system 1600 and cause one or more actions to be carried out based on machine-readable instructions including those stored within controller 1652 and/or other machine-readable instructions received at controller 1652 via wired and/or wireless communication. Data processor 1654 may include one or more microcontrollers or other suitably programmed or programmable logic circuits.

Controller 1652 may also comprise memory(ies) and memory data devices or register(s) (referred hereinafter as "memory 1656"). Memory 1656 may comprise any storage means (e.g., devices) suitable for retrievably storing machine-readable instructions executable by data processor 1654 of controller 1652 and other data. Memory 1656 may be non-volatile and may include erasable programmable read only memory (EPROM), flash memory, and/or other electromagnetic media suitable for storing electronic data signals in volatile or non-volatile, non-transient form. Memory 1656 may contain machine-readable instructions for execution by data processor 1654 and also other data related to the operation of the flexible feeding device 100. For example, memory 1656 may hold feedback data representative of feedback signals received from one or more sensors associated with flexible feeding device 100.

Machine-readable instructions stored in memory 1656 may cause controller 1652 to cause the execution of various methods (or parts thereof) disclosed herein including the generation of one or more signals 1658 useful in the operation of system 1600. Such machine-readable instructions may be incorporated into one or more computer program products which may be stored on suitable medium or media. In some embodiments, the machine-readable instructions may be executable by data processor 1654 and configured to cause data processor 1654 to generate signals 1658 useful in the synchronization of two or more operations carried out by flexible feeding device 100. In one example, the machine-readable instructions may be configured to cause data processor 1654 to generate signals 1658 to synchronize picking parts in part retainers 102, positioning empty carriers 105, and placing parts into carriers 105. In another example, the machine-readable instructions may be configured to cause data processor 1654 to generate signals 1658 to synchronize dispersing parts into a part retainer 102, agitating the parts on the part retainer 102, and removing the parts that did not get captured in holders of the part retainer 102.

The synchronization of two or more operations of flexible feeding device 100 may effectively comprise electronic camming and/or electronic gearing instead of mechanical cams and/or gears use in some existing applications. In various embodiments, the use of such electronic synchronization may provide more flexibility and improved performance of system 1600 in comparison with existing systems comprising mechanical synchronization means. Accordingly, in various embodiments, memory 1656 may hold data representative of one or more cam profiles to be used in the operation of flexible feeding device 100. For example, such cam profile(s) may be in tabular form and may comprise corresponding positions representative of synchronized trajectories to be followed by different elements of flexible feeding device 100. In various embodiments, one element of flexible feeding device 100 may be operated as a master device and another element of flexible feeding device 100 may be operated as a slave device executing movements based on the execution of movements by the master device in order to substantially maintain synchronization between the slave devices and the master device. In some embodiments, system 1600 may comprise one or more master devices and one or more respective slave devices. For example, one or more slave devices may be electronically cammed with a master device.

Accordingly, in various embodiments, the machine-readable instructions may be configured to cause data processor 1654 to generate signals 1658 useful in causing electronic camming of the delivery of an unattached element (e.g., carrier 105) of flexible feeding device 100 by one attached element (e.g., transporter 106) of flexible feeding device 100 and of the receipt of that unattached element by another attached element (e.g., carrier inspection disc 107) of flexible feeding device 100.

In an embodiment, the machine-readable instructions may be configured to cause the data processor 1654 to generate signals 1658 that instruct the flexible feeding device 100 to execute flexible feeding operations. Each of the flexible feeding operations may be performed by one or more elements of the flexible feeding device 100. The flexible feeding operations may include: a transporter 106 positioning carriers 105 that are initially empty at a loading station; a disperser 101 placing bulk parts in a metering device; a disperser 101 dispensing a metered amount of the bulk parts into a part retainer 102; a vibrator 103 agitating the metered amount of the bulk parts; an excess part removal device 150 removing parts that did not get captured in holders of the part retainer 102; a pick-and-placer 104 picking parts that got captured in the holders; the pick-and-placer 104 placing the parts into the carriers 105; a carrier inspector 108 inspecting the carriers 105 to determine if the carriers 105 are empty; a transporter 106 positioning the inspected carriers 105 at a transfer station 111; and a transfer device 114 obtaining parts from the inspected carriers 105 and transferring them to a downstream processor. The machine-readable instructions may be configured to cause the data processor to generate signals useful in synchronization of at least two of the above flexible feeding operations.

The devices, systems, and methods described above may lend themselves to high and scalable output, where output is defined as the rate at which carriers 105 holding discrete parts are delivered to the downstream processor. As will be understood by the skilled worker, the specific output of any given embodiment may be calculated as a function of one or more of the following engineering variables:

The size of the part retainer 102, and the number of pockets it contains.
The number of discrete parts dispersed onto part retainer 102 by disperser 101.
The amplitude and frequency of vibrational energy applied to part retainer 102 by vibrator 103.
The duration of the agitation period (that is, the time during which vibrational energy is applied to part retainer 102 by vibrator 103).
The number of grippers on the pick-and-placer 104.
The number of potential parts (which is equal to the number of grippers) that can be placed in carriers 105 with each stroke of pick-and-placer 104.
The number of subsystems formed by parts 101 to 105 that operate in parallel.
The number of subsystems formed by parts 101 to 110, 112, and 113 that operate in parallel, feeding a common transfer device 111.

The optimal values for the above engineering variables can vary case by case. Furthermore, depending on the case, values may be determined by analysis, simulation, and/or empirical testing.

Several embodiments of a high-output flexible feeding system have now been described. It will be appreciated that the particular number, shape, orientation, symmetry, or other aspect of the part retainers, pockets, carriers, transporters, and related devices are not intended to be limiting in any respect.

The present disclosure describes several systems and methods that are advantageous over the prior art in that a part feeding system can be easily re-configured from a configuration where one type of parts are being fed to another configuration where a different type of parts are being fed. The re-configuration can be effected by substituting the part-retaining device used for the original type of parts with another part-retaining device designed for the different type of parts. To achieve this substitution, the initial part-receiving device is uncoupled from the equipment to which it is coupled (e.g., a vibrator) and the other part-retaining device is coupled in its place. If need be, the part carriers used for the original type of parts can be substituted with others carriers designed for the different type of parts. This can be achieved by uncoupling the initial carriers from the transporter and coupling the other carriers to the transporter. Further, if need be, the pick-and-placer device can be re-programmed from initial settings where the interspacing of the grippers and the force applied by the grippers are changed to new settings where the interspacing of the grippers and/or the force applied by the grippers are selected in accordance with the interspacing of the part holders on the part-retaining device designed for the different type of parts and on various physical attributes of the different type of parts (e.g., size, weight, friction coefficient of the surface the part, etc.) As will be understood by the skilled worker, the ability to re-configure the feeding system as described above provides very low downtime in comparison with the re-configuration downtime of prior art systems where a re-configuration to accommodate a change of parts could take days if not weeks.

Systems and methods described herein do not rely on vision-guided robotic feeding systems for aligning picking and placing parts in a particular orientation. This is advantageous in that the systems and methods of the present disclosure are not limited by the low output rate of prior art, machine vision enabled equipment.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art. The scope of the claims should not be limited by the particular embodiments set forth herein, but should be construed in a manner consistent with the specification as a whole.

The invention claimed is:

1. A method of feeding parts, the method comprising:
moving a plurality of empty part carriers through a loading station;
repeatedly operating a pick-and-place robot according to a sequence, the sequence comprising moving the pick-and-place robot between a pick-up position in a picking area for picking parts from a part-retaining device when in the picking area, and a drop-off position for placing any picked parts into respective empty part carriers at the loading station;
while the pick-and-place robot repeatedly operates according to the sequence,
receiving a plurality of parts on the part-retaining device at a receiving area, the part-retaining device defining a plurality of part holders fixed relative to each other for alignment with the pick-up position when the part-retaining device is positioned in the picking area, each part holder comprising a pocket having a geometry complementary to at least a portion of a part for nesting of the part in the pocket; and
moving the part-retaining device with the plurality of parts thereon from the receiving area to the picking area for transfer of the plurality of parts from the part-retaining device to the respective empty part carriers by the pick-and-place robot operating according to the sequence; and
for each part carrier exiting the loading station:
determining whether the part carrier is occupied or empty:
in response to determining that the part carrier is empty, returning the empty part carrier to the loading station; and
in response to determining that the part carrier is occupied, diverting the occupied part carrier to a downstream process.

2. The method of claim 1, wherein:
the pick-and-place robot comprises a plurality of end-of-arm tooling; and
the sequence comprises simultaneously actuating the plurality of end-of-arm tooling at the picking area to simultaneously pick any parts held by the part holders when the part-retaining device is positioned at the picking area.

3. The method of claim 2, wherein each end-of-arm tooling of the plurality of end-of-arm tooling comprises a gripper.

4. The method of claim 2, wherein placing the parts into respective empty part carriers moving through the loading station comprises placing simultaneously any picked parts into respective empty part carriers moving through the loading station.

5. The method of claim 4, wherein the sequence comprises simultaneously actuating the plurality of end-of-arm tooling at the loading station to simultaneously place any picked parts into respective empty part carriers moving through the loading station.

6. The method of claim 2, wherein:
each part holder retains the part in an orientation different from an orientation in which the part carrier retains the part; and
the sequence comprises, prior to placing simultaneously the parts into respective empty part carriers, the pick-and-place robot rotating simultaneously the picked parts from the orientation in which the part holder retains the part to the orientation in which the part carrier retains the part.

7. The method of claim 6, wherein the part holder retains the part in a sideways orientation.

8. The method of claim 6, wherein the part carrier retains the part in a vertical orientation.

9. The method of claim 2, wherein:
each part carrier defines a carrier portion having a geometry complementary to at least a portion of a part for retaining the part thereon;
the plurality of part holders defined within the part-retaining device are spaced apart by a pitch; and
as the plurality of empty part carriers are moved through the loading station, the carrier portions are spaced apart by a gap equal to the pitch.

10. The method of claim 9, wherein the plurality of end-of-arm tooling are spaced apart from each other by a distance equal to the pitch when simultaneously picking any parts held by the part holders.

11. The method of claim 1, further comprising, for each occupied part carrier:
determining whether the occupied part carrier meets a pass criteria;
in response to determining that the occupied part carrier meets the pass criteria, diverting the occupied part to the downstream process; and
in response to determining that the occupied part carrier does not meet the pass criteria, removing the part from the part carrier and returning the empty part carrier to the loading station.

12. The method of claim 11, wherein the pass criteria comprises the part having a pre-determined orientation within the part carrier.

13. The method of claim 1, further comprising after transfer of the plurality of parts from the part-retaining device, moving the part-retaining device from the picking area and moving another part-retaining device to the picking area for transfer of another plurality of parts held on that part-retaining device by the pick-and-place robot.

14. A system for feeding parts, the system comprising:
a pick-and-place robot operable according to a sequence, the sequence comprising moving the pick-and-place robot between a pick-up position in a picking area for picking parts from a part-retaining device when in the picking area, and a drop-off position for placing any picked parts into respective empty part carriers moving through the loading station;
the part-retaining device defining a plurality of part holders fixed relative to each other for alignment with the pick-up position when the part-retaining device is in the picking area, each part holder comprising a pocket having a geometry complementary to at least a portion of a part for nesting of the part in the pocket;
a first transfer device operable to move the part-retaining device between a receiving area to receive a plurality of parts and the picking area with the plurality of parts thereon while the pick-and-place robot repeatedly operates according to the sequence; and a second transfer device operable to:
move a plurality of empty part carriers through the loading station;
divert occupied part carriers exiting the loading station to a downstream process; and
return empty part carriers to the loading station;

at least one processor operable to, for each part carrier exiting the loading station:
receive sensor data for the part carrier;
determine whether the part carrier is occupied or empty based on the sensor data;
in response to determining that the part carrier is empty, operating the second transfer device to return the empty part carrier to the loading station; and
in response to determining that the part carrier is occupied, operating the second transfer device to divert the occupied part carrier to the downstream process.

15. The system of claim 14, wherein:
the pick-and-place robot comprises a plurality of end-of-arm tooling; and
the sequence comprises simultaneously actuating the plurality of end-of-arm tooling at the picking area to simultaneously pick any parts held by the part holders when the part-retaining device is positioned at the picking area.

16. The system of claim 15, wherein each end-of-arm tooling of the plurality of end-of-arm tooling comprises a gripper.

17. The system of claim 15, wherein the pick-and-place robot being operable to place the parts into respective empty part carriers moving through the loading station comprises the pick-and-place robot being operable to place simultaneously any picked parts into respective empty part carriers moving through the loading station.

18. The system of claim 17, wherein the sequence comprises simultaneously actuating the plurality of end-of-arm tooling at the loading station to simultaneously place any picked parts into respective empty part carriers moving through the loading station.

19. The system of claim 15, wherein:
each part holder retains the part in an orientation different from an orientation in which the part carrier retains the part; and
the sequence comprises, prior to placing simultaneously the parts into respective empty part carriers, the pick-and-place robot rotating simultaneously the picked parts from the orientation in which the part holder retains the part to the orientation in which the part carrier retains the part.

20. The system of claim 19, wherein the part holder retains the part in a sideways orientation.

21. The system of claim 19, wherein the part carrier retains the part in a vertical orientation.

22. The system of claim 15, wherein:
each part carrier defines a carrier portion having a geometry complementary to at least a portion of a part for retaining the part thereon;
the plurality of part holders defined within the part-retaining device are spaced apart by a pitch; and
as the plurality of empty part carriers are moved through the loading station, the carrier portions are spaced apart by a gap equal to the pitch.

23. The system of claim 22, wherein the plurality of end-of-arm tooling are spaced apart from each other by a distance equal to the pitch when simultaneously picking any parts held by the part holders.

24. The system of claim 14 wherein the at least one processor is further operable to, for each occupied part carrier:
determine whether the occupied part carrier meets a pass criteria based on the sensor data;
in response to determining that the occupied part carrier meets the pass criteria, operating the second transfer device to divert the occupied part to the downstream process; and
in response to determining that the occupied part carrier does not meet the pass criteria, operating an actuator component to remove the part from the part carrier and operating the second transfer device to return the empty part carrier to the loading station.

25. The system of claim 24 wherein the pass criteria comprises the part having a pre-determined orientation within the part carrier.

26. The method of claim 1, wherein the part-retaining device comprises a tray defining the plurality of part holders.

27. The system of claim 14, further comprising at least one additional part-retaining device for holding another plurality of parts, each part-retaining device movable sequentially to and from the picking area for transfer of a respective plurality of parts held in that part-retaining device by the pick-and-place robot.

* * * * *